(12) United States Patent
Trujillo

(10) Patent No.: US 12,459,547 B2
(45) Date of Patent: Nov. 4, 2025

(54) HOPPER CAR OUTLET GATE MECHANICAL FLAP TO PREVENT PELLET LOSS

(71) Applicant: Chevron Phillips Chemical Company LP, The Woodlands, TX (US)

(72) Inventor: Gary A. Trujillo, Pasadena, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 698 days.

(21) Appl. No.: 17/713,388

(22) Filed: Apr. 5, 2022

(65) Prior Publication Data

US 2022/0315064 A1 Oct. 6, 2022

Related U.S. Application Data

(60) Provisional application No. 63/171,192, filed on Apr. 6, 2021.

(51) Int. Cl.
*B61D 7/22* (2006.01)
*B61D 7/18* (2006.01)
*B61D 7/26* (2006.01)

(52) U.S. Cl.
CPC ............. *B61D 7/22* (2013.01); *B61D 7/18* (2013.01); *B61D 7/26* (2013.01)

(58) Field of Classification Search
CPC .............. B61D 7/18; B61D 7/22; B61D 7/26
See application file for complete search history.

(56) References Cited

U.S. PATENT DOCUMENTS

| | | | | |
|---|---|---|---|---|
| 3,797,891 A * | 3/1974 | Fritz | ............... | B65G 53/4658 105/283 |
| 4,101,175 A * | 7/1978 | Kull | ............... | B65G 53/12 406/146 |
| 4,382,724 A * | 5/1983 | Green | ............... | B65D 90/587 105/310.1 |
| 4,975,000 A * | 12/1990 | Fritz | ............... | B65D 90/545 406/128 |
| 5,613,446 A * | 3/1997 | DiLuigi | ............... | B61D 7/22 105/310 |
| 6,067,912 A * | 5/2000 | Miller | ............... | B61D 7/28 105/283 |

(Continued)

FOREIGN PATENT DOCUMENTS

CA 2029946 A1 * 5/1991
CA 3090584 C * 4/2024

*Primary Examiner* — Jason C Smith
(74) *Attorney, Agent, or Firm* — Scheef & Stone, L. L. P.; Keith C. Rawlins, Esq.

(57) ABSTRACT

An outlet gate/gate assembly having a trough section having opposing slanted sheets, and an end sheet at ends thereof, the trough section defining a trough, and each end sheet providing a discharge opening fluidly connected with the trough; and an end tube/end adapter assembly fluidly connected with each end sheet, the end tube/end adapter assembly comprising an end adapter, an outlet cap, and an end tube seal/end adapter gasket, the end tube seal/end adapter gasket positioned between the end sheet and the end adapter or within the end adapter, wherein the end tube seal/end adapter gasket comprises a base plate and a primary/main flap, the base plate defining a discharge opening, and the primary/main flap biased to, when closed, completely cover the discharge opening.

26 Claims, 15 Drawing Sheets

(56) References Cited

U.S. PATENT DOCUMENTS

| | | | | |
|---|---|---|---|---|
| 6,431,084 | B1* | 8/2002 | Gaydos | B61D 7/20 |
| | | | | 105/247 |
| 9,493,172 | B2* | 11/2016 | Mclaughlin | B61D 7/30 |
| 11,084,508 | B2* | 8/2021 | Vande Sande | B61D 9/00 |
| 2015/0132071 | A1* | 5/2015 | Wolf | F16K 17/164 |
| | | | | 406/12 |
| 2018/0345998 | A1* | 12/2018 | Reitz | B61D 7/20 |
| 2019/0225248 | A1* | 7/2019 | Lidgett | B61D 7/26 |
| 2022/0315064 | A1* | 10/2022 | Trujillo | B61D 7/26 |
| 2022/0371629 | A1* | 11/2022 | Vande Sande | B61D 7/22 |

* cited by examiner

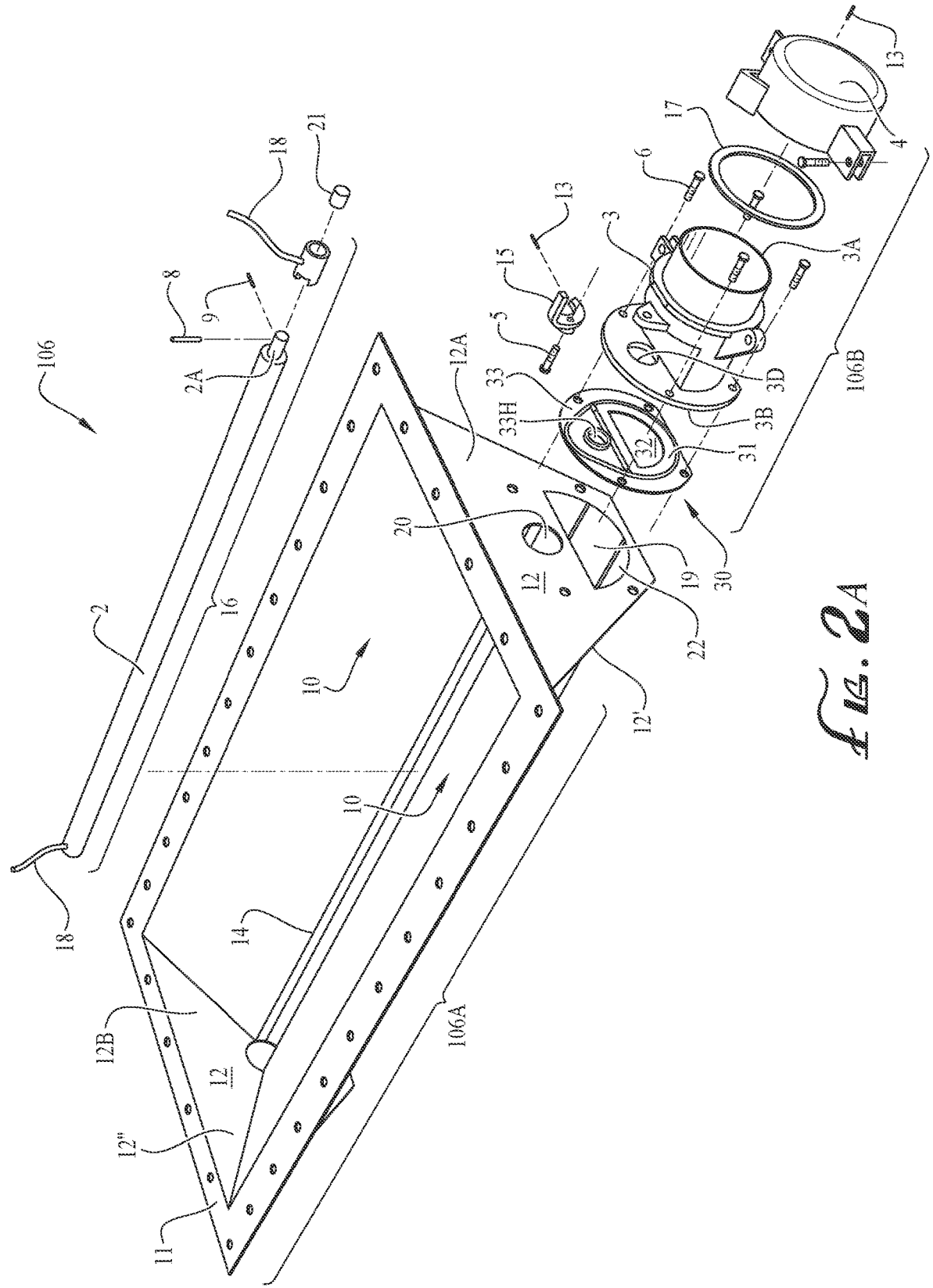

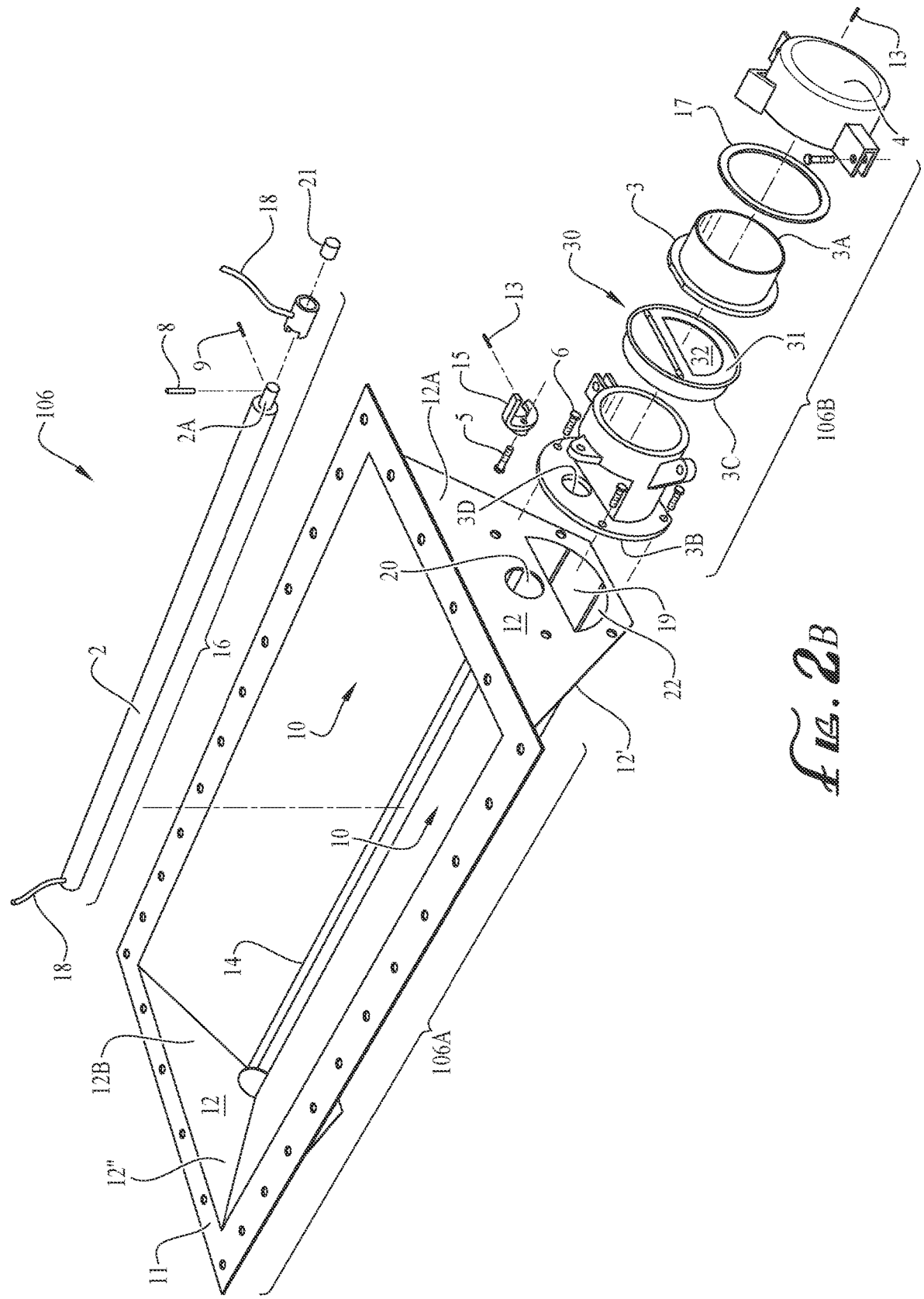

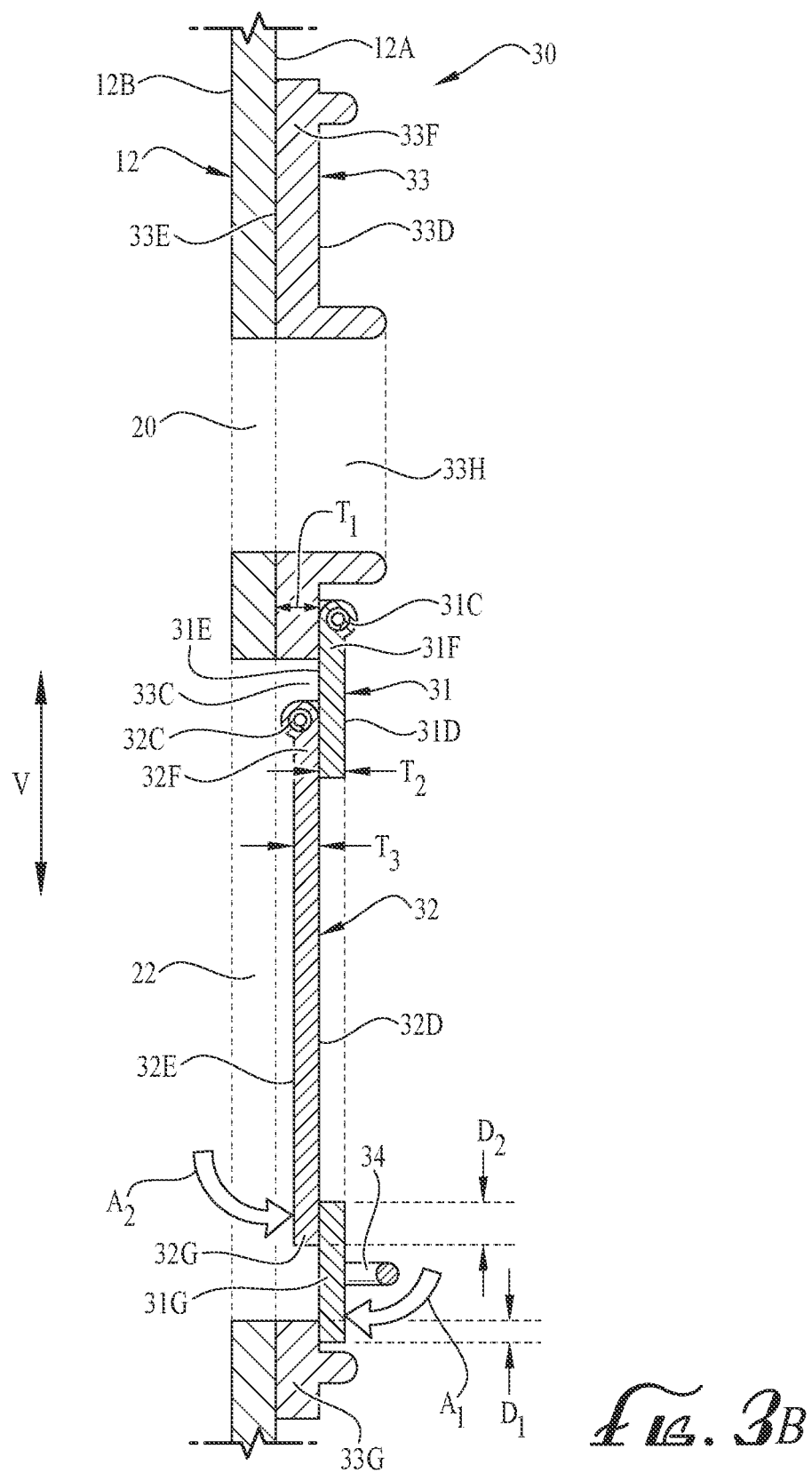

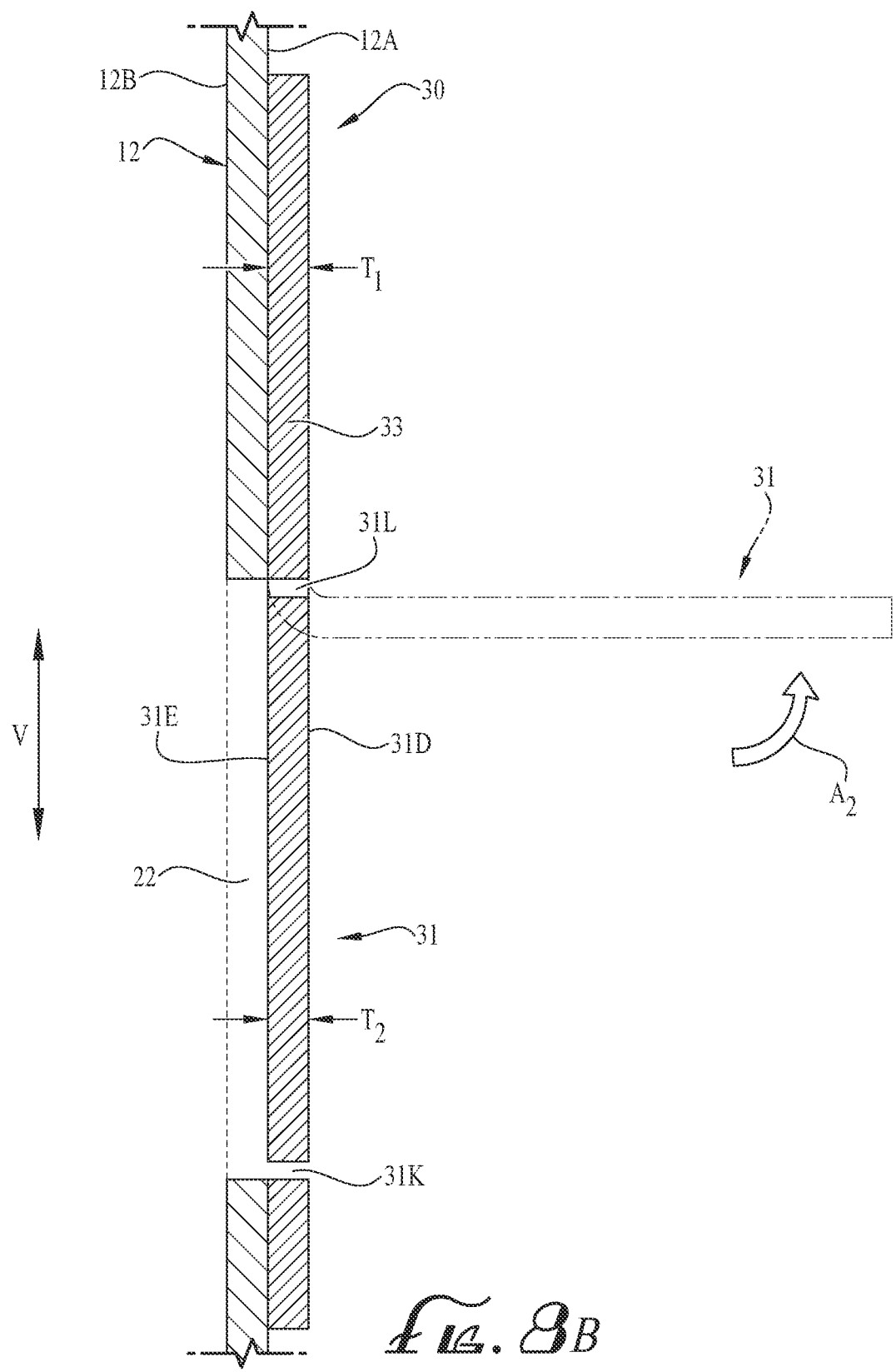

HOPPER CAR OUTLET GATE MECHANICAL FLAP TO PREVENT PELLET LOSS

CROSS-REFERENCE TO RELATED APPLICATIONS

This application claims priority to U.S. Provisional Application No. 63/171,192 filed Apr. 6, 2021, and entitled "Hopper Car Outlet Gate Mechanical Flap to Prevent Pellet Loss," which is incorporated herein by reference in its entirety.

FIELD OF THE INVENTION

This disclosure relates generally to a system and method for transporting materials, such as polymer pellets; more particularly, this disclosure relates to an end tube seal/end adapter gasket of an outlet gate/gate assembly for a plastic pellet covered hopper railcar (also referred to herein as a "hopper car"), and a method for utilizing same whereby product loss during transit or storage of the hopper car can be reduced or eliminated; still more particularly, this disclosure relates to an end tube seal/end adapter gasket of an outlet gate/gate assembly for a hopper car, wherein the end tube seal/end adapter gasket comprises a primary or main flap, in embodiments with a built-in spring for ensuring normal closure of the primary/main flap, and optionally a secondary or bypass flap for ventilation during transfer of product.

BACKGROUND

When a polymer pellet product is transported via a hopper car from a production or loading facility to a customer or upon return, the hopper car may contain residual product (a "heel) that can also be inadvertently lost to the environment when one or more transfer valves are left open and/or when one or more outlet caps are not correctly positioned to prevent the flow of product (e.g., polymer pellets) from a hopper car to the environment. This inadvertent loss of polymer pellets can be undesirable from an environmental standpoint, as such lost product can be harmful to the environment leading to punitive fines and public questioning of a company's commitment to protecting the environment. The inadvertent loss of polymer pellets also represents an economic loss. In the case of hopper cars returned with residual product (a "heel), the polymer pellets lost to the environment could have been sold to polymer recyclers or off-specification polymer brokers.

Accordingly, given the commercial importance of preventing the loss of polymer pellets during transport of product in a plastic pellet covered hopper car to a customer and the loss of any heel during the return of the hopper car, an ongoing need exists for improved systems and methods therefor.

SUMMARY

Disclosed herein is an outlet gate/gate assembly for a hopper car, the outlet gate/gate assembly comprising: a trough section, wherein the trough section comprises opposing slanted sheets and an end sheet at each end of the opposing slanted sheets, wherein the trough section defines a trough, and wherein each end sheet provides a discharge opening fluidly connected with the trough; and an end tube/end adapter assembly fluidly connected with each end sheet, wherein the end tube/end adapter assembly comprises an end adapter (also referred to as an "outlet tube"), an outlet cap, and an end tube seal/end adapter gasket, wherein the end tube seal/end adapter gasket is positioned between the end sheet and the end adapter, wherein the end tube seal/end adapter gasket comprises a base plate and a primary/main flap (e.g., a spring-loaded primary flap or single main flap, as described hereinbelow), wherein the base plate defines a discharge opening, and wherein the primary/main flap is characterized in that, in a closed position, the primary/main flap completely covers the discharge opening. In aspects, the trough section further comprises a shaft valve, the trough is below the shaft valve, and each end sheet further comprises a shaft opening through which an end of a valve rod of the shaft valve extends.

Also disclosed herein is an end tube seal/end adapter gasket of an outlet gate/gate assembly for a hopper car, the end tube seal/end adapter gasket comprising: a base plate and a primary/main flap, wherein the base plate defines a discharge opening, and wherein the primary/main flap is configured such that, in a normal closed position, the primary/main flap completely covers the discharge opening.

Further disclosed herein is an outlet gate/gate assembly for a hopper car, the outlet gate/gate assembly comprising: a trough section, wherein the trough section comprises opposing slanted sheets and an end sheet at each end of the opposing slanted sheets, wherein the trough section defines a trough, and wherein each end sheet provides a discharge opening fluidly connected with the trough; and an end tube/end adapter assembly fluidly connected with each end sheet of the trough section, wherein the end tube/end adapter assembly comprises an end adapter, an outlet cap, and an end tube seal/end adapter gasket of this disclosure comprising: a base plate and a primary/main flap, wherein the base plate defines a discharge opening, and wherein the primary/main flap is configured such that, in a normal closed position, the primary/main flap completely covers the discharge opening. The end tube seal/end adapter gasket can be positioned between the end sheet and the end adapter or within the end adapter/outlet tube. In aspects, the trough section further comprises a shaft valve, the trough is below the shaft valve, and each end sheet further comprises a shaft opening through which an end of a valve rod of the shaft valve extends.

Also disclosed herein is a method of preventing inadvertent loss of plastic pellets during transfer of material from and transport via a hopper car, the method comprising: replacing an end gasket of an outlet gate assembly with an end tube seal/end adapter gasket comprising: a base plate and a primary/main flap, wherein the base plate defines a discharge opening, and wherein the primary/main flap is configured such that, in a normal closed position, the primary/main flap completely covers the discharge opening.

Further disclosed herein is a method of preventing inadvertent loss of material (e.g. plastic pellets) during transfer of material from and transport via a hopper car, wherein the hopper car comprises at least one outlet gate/gate assembly of this disclosure, the method comprising: loading, at a loading site, a hopper car with material via one or more hatches, wherein, during the loading, each at least one outlet gate/gate assembly of this disclosure is configured in a closed position (e.g., with the shaft valve in a closed position), the primary/main flap of the end tube seal/end adapter gasket of each end tube/end adapter assembly is in the closed position, and the outlet cap of each end tube/end adapter assembly covering the end adapter thereof; transporting the material in the hopper car to an offloading site;

transferring material from the hopper car from the hopper car by: removing the outlet cap from the end tube/end adapter assembly attached to a first end of the trough section of the at least one outlet gate/gate assembly and attaching a pneumatic transfer hose therewith, opening the outlet gate/gate assembly (e.g., opening the shaft valve via a handle), and pneumatically transferring material from the trough section of the at least one outlet gate/gate assembly, wherein, during the pneumatic transfer, the primary/main flap of the end tube/end adapter assembly on the first end is open, and the primary/main flap of the end tube/end adapter assembly on a second end of the trough section opposite the first end is closed; and discontinuing the pneumatic transferring, whereby the primary/main flap on the end tube/end adapter assembly on the first side closes due to the bias provided by a material and/or spring-biased hinge thereof, and optionally closing the outlet gate/gate assembly (e.g., closing the shaft valve via the handle and/or replacing the outlet cap over the end adapter).

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, unless otherwise indicated, and in which:

FIG. 2A is a schematic of an outlet gate/gate assembly according to embodiments of the present disclosure;

FIG. 2B is a schematic of an outlet gate/gate assembly according to embodiments of the present disclosure;

FIG. 3B is a side view of the end tube seal/end adapter gasket of FIG. 3A;

FIG. 8B is a side view of the end tube seal/end adapter gasket of FIG. 7A.

DETAILED DESCRIPTION

Herein disclosed is an outlet gate (also referred to herein as a "gate assembly") for a plastic pellet covered hopper railcar (also referred to herein as a "hopper car"). The disclosed outlet gate/gate assembly utilizes a mechanical flap (also referred to as a "seal") to prevent plastic pellet loss. The flap can reduce or eliminate the inadvertent loss of plastic pellets due to human error, for example, when valves are left open and/or outlet caps are left off an end adapter (also referred to as an "outlet tube") of the outlet gate/gate assembly during product transit or return. Accordingly, the disclosed outlet gate/gate assembly can be operable to reduce or eliminate the environmental impact of lost plastic pellets and increase the capture of the residual or returned product for sale, e.g. profit can potentially be made on polymer pellets inadvertently left in outlet tube(s) and/or hopper cars after product delivery by retention and sale of said product facilitated by the outlet gate/gate assembly described herein. As detailed further hereinbelow, the mechanical flap(s) or seals can be designed for and installed adjacent the hopper trough and/or into a hopper car outlet tube, as described hereinabove.

Figure 1:
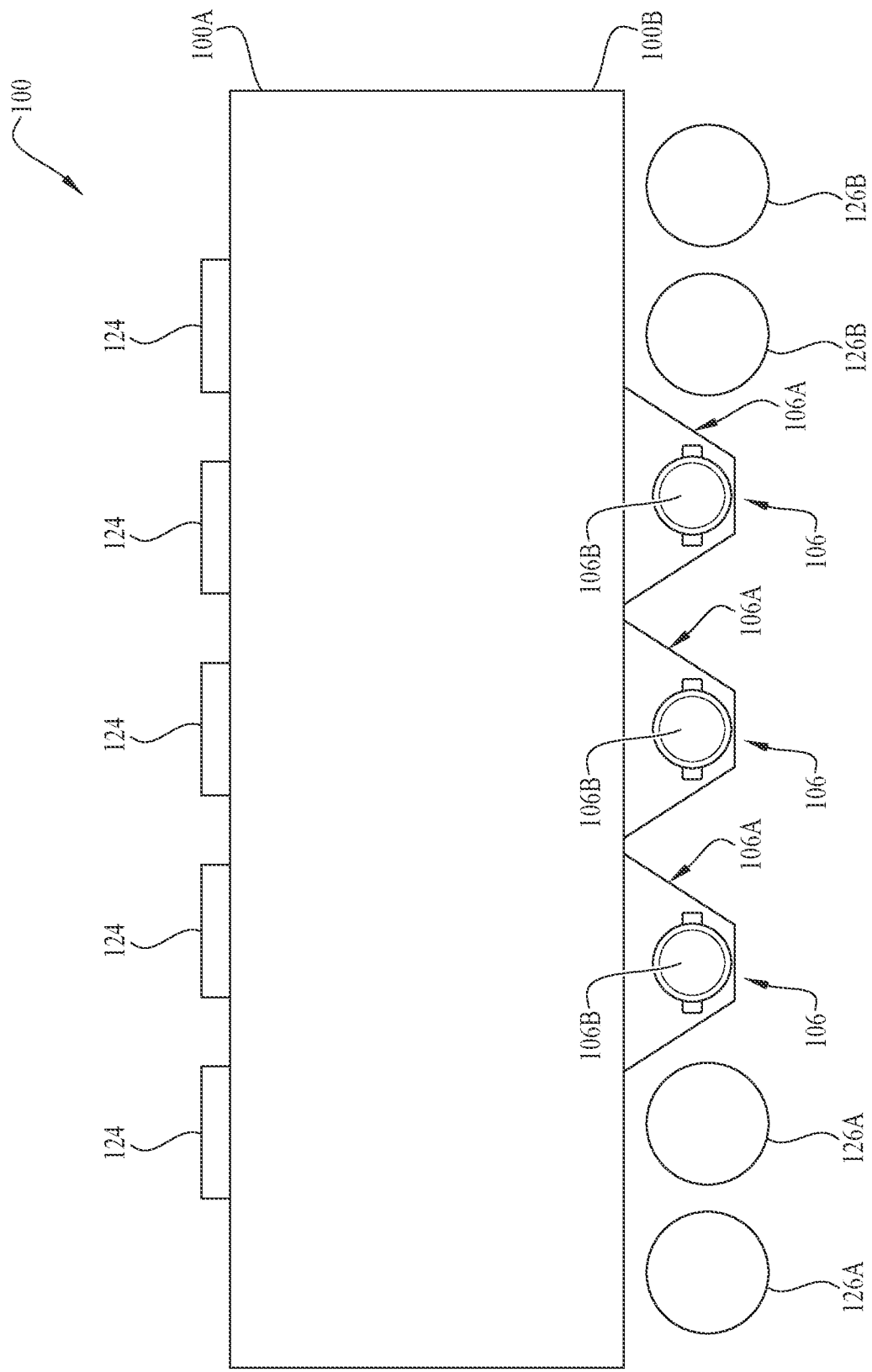
FIG. 1 is a schematic of a hopper car comprising an outlet gate/gate assembly according to embodiments of the present disclosure.

FIG. 1 is a schematic of a hopper car 100 comprising an outlet gate/gate assembly 106 according to an embodiment of the present disclosure. A hopper car 100 can comprise one or a plurality of outlet gates/gate assemblies 106, with three depicted in FIG. 1. Polymer pellets can be loaded into hopper car 100 via one or more hatches 124, with five depicted in the embodiment of FIG. 1. Hatches 124 can be located on a top 100A of hopper car 106. Each outlet gate/gate assembly 106 comprises a trough section 106A and an end tube assembly (also referred to herein as an end adapter assembly) 106B positioned at a bottom 100B of hopper car 106, between front wheels 126A and back wheels 126B thereof.

Disclosed herein is an end tube seal/end adapter gasket of an outlet gate/gate assembly for a hopper car, such as hopper car 100 of FIG. 1. The end tube seal/end adapter gasket comprises a base plate and a primary flap (also referred to herein as a "main flap"). The primary/main flap can be a primary flap, such as a hinged primary/main flap as described hereinbelow with reference to FIG. 3A-FIG. 5B, or can be a sole or main flap of the end tube seal/end adapter gasket, as described hereinbelow with reference to FIG. 6A-FIG. 7D. The base plate defines a discharge opening, and the primary/main flap is configured such that, in a normal closed position, the primary/main flap completely covers the discharge opening. The base plate can be a separate component from the primary/main flap, as described, for example, with reference to FIG. 3A-FIG. 6B hereinbelow, or the base plate can be integrated with the primary/main flap, for example, as shown in FIG. 7A-FIG. 7D. The end tube seal/end adapter gasket can be utilized in any suitable outlet gate assembly 106. The end tube seal/end adapter gasket of this disclosure will now be described with reference to FIG. 2A, which is a schematic of an exemplary outlet gate/gate assembly 106, comprising an end tube seal/end adapter gasket 30 according to embodiments of the present disclosure. End tube seal/end adapter gasket 30 of outlet gate/gate assembly 106 for a hopper car 100 comprises: base plate 33 and primary/main flap 31. As noted above, base plate 33 defines a discharge opening (33C, see FIG. 4A, described hereinbelow), and the primary/main flap 31 is biased such that, in a normal closed position, the primary/main flap 31 completely covers the discharge opening 33C.

Outlet gate/gate assembly 106 comprises: a trough section 106A and an end tube assembly (also referred to herein as an end adapter assembly) 106B. A variety of outlet gates/gate assemblies 106 can incorporate an end tube seal/end adapter gasket 30 of this disclosure. In embodiments, the outlet gate/gate assembly 106 is a pneumatic outlet gate/gate assembly.

As depicted in the embodiment of FIG. 2A, trough section 106A can comprise a shaft valve 16, opposing slanted sheets 10 and an end sheet 12 at each end of the opposing slanted sheets 10. Opposing slanted sloped sheets 10 extend from an end sheet 12 on a first end 12' of trough section 106A to an end sheet 12 on a second end 12" thereof. Each end sheet 12 has a front or exterior side 12A and a back or interior side 12B. The trough section 106A defines a trough 19 below the shaft valve 16. Materials introduced into the hopper car 100 via hatches 124 are directed into trough 19 via the opening of shaft valve 16 and longitudinal edges 14 defined by the bottom of slanted sloped sheets 10. Each end sheet 12 provides a discharge opening 22 fluidly connected with the trough 19, and a shaft opening 20 through which an end 2A of a valve rod 2 of shaft valve 16 extends. The valve rod 2 of shaft valve 16 additionally extends through shaft opening 33H of the end tube seal/end adapter gasket 30 and optionally hole 3D in end adapter 3 attached on one or both of first end 12' and second end 12" of trough section 106A. Trough section 106A can further comprise additional components. For example, trough section 106A can comprise a rectangular horizontal frame 11 along a top of end sheets 12 and opposing slanted sides 10. As noted above, the end tube seal/end adapter gasket 30 of this disclosure can be utilized with outlet gate/gate assemblies 106 comprises trough sections of different designs than that of trough section 106A depicted in the embodiment of FIG. 2A. Shaft valve 16 can comprise additional components, such as, for example, handles 18 at each end thereof, for opening and closing the shaft valve 16, turning pins 8, rolling pins 9, and shaft sleeves 21. A gasket 17 can be positioned between end adapter 3 and end cap 4. In alternative embodiments, the trough section 106A does not comprise a shaft valve 16, but may have other opening and closing apparatus.

An end tube/end adapter assembly 106B can be fluidly connected with one or both end sheet 12, such that each side of hopper car 100 has associated end tube/end adapter assemblies 106B. For example, in FIG. 2A, a first end 12' of trough section 106A can be connected with end tube/end adapter assembly 106B connected with the exterior 12A of the end sheet 12 on first end 12', and trough section 106A can also be connected with another end tube/end adapter assembly 106B (not depicted in FIG. 2A) connected on the exterior 12A of another end sheet 12 on a second end 12" of trough section 106A. Thus, each trough section 106A can be associated with two end tube/end adapter assemblies 106B, one on one side of hopper car 100, and another on an opposite side of hopper car 100. Thus, for example, hopper car 100 of FIG. 1 can have six end tube/end adapter assemblies 106, with three on a side directed toward the viewer of FIG. 1, and three on an opposite side of hopper car 100, away from the viewer.

Each end tube/end adapter assembly 106B comprises an end tube seal/end adapter gasket 30 of this disclosure, comprising a base plate 33 and a primary/main flap 31, wherein the base plate 33 defines the discharge opening 33C, and wherein the primary/main flap 31 is biased such that, in the closed position, the primary/main flap 31 completely covers the discharge opening 33C. A variety of outlet gate/gate assemblies 106 can utilize the end tube seal/end adapter gasket 30 of this disclosure, and depiction of one specific end tube/end adapter assembly 106B in the drawings is not intended to be limiting thereto. In the embodiment of FIG. 2A, each end tube/end adapter assembly 106B can further comprise an end adapter 3 (also referred to as an "outlet tube"), an outlet cap (also referred to herein as a "dust cover" or "end cap") 4. In aspects, such as depicted in FIG. 2A, the end tube seal/end adapter gasket 30 can be positioned between the end sheet 12 and the end adapter 3. However, the end tube seal/end adapter gasket 30 can be positioned elsewhere within the outlet gate/gate assembly 106. For example, rather than being positioned adjacent end sheet 12, end tube seal/end adapter gasket 30 can be positioned further downstream within the end tube/end adapter assembly 106B. In the embodiment of FIG. 2B, which is a schematic of an outlet gate/gate assembly 106 according to another embodiment of the present disclosure, end tube seal/end adapter gasket 30 is positioned on a flange 3C positioned within a split end adapter 3 between front end 3A of end adapter 3 and back end 3B thereof. In such embodiments, a conventional gasket can be utilized between end adapter 3 and end sheet 12. The components of the end tube/end adapter assembly 106 can be held together and affixed to end sheets 12 via any suitable means, such as via hex bolts 6 and roll pin(s) 13. Shaft valve 16 can be opened and closed via handles 18, and locked via shaft lock 15, and, for example, associated headed pin(s) 5 and roll pin(s) 13.

Figure 3A:
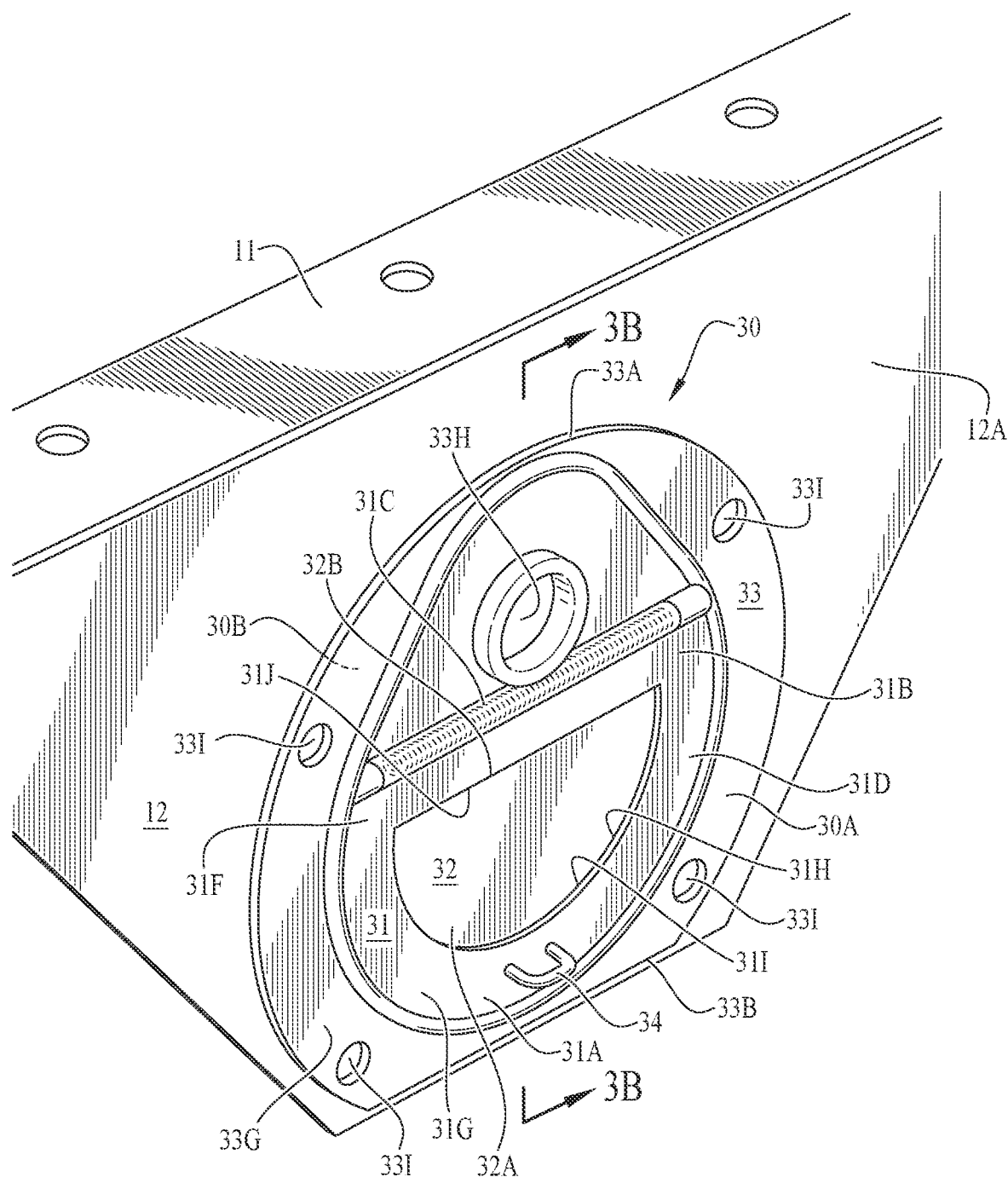
FIG. 3A is a schematic of an end tube seal/end adapter gasket according to embodiments of the present disclosure, wherein a primary/main flap of the end tube seal/end adapter gasket is shown in a closed position.

FIG. 3A is a schematic of an end tube seal/end adapter gasket 30 positioned on the exterior 12A of (one or both) end sheet 12 according to embodiments of the present disclosure. In the embodiment of FIG. 3A, primary/main flap 31 is a spring-loaded primary/main flap 31, and is depicted in a closed position in which spring-loaded primary/main flap 31 completely covers the discharge opening 22 of end sheet 12 and discharge opening 33C (see FIG. 4A, described further hereinbelow) of end tube seal/end adapter gasket 30. FIG. 3B is a side view of the end tube seal/end adapter gasket 30 of FIG. 3A. Spring-loaded primary/main flap 31 comprises a semicircular lower portion 31A extending from a bottom 31G thereof, a substantially horizontal upper portion 31B at a top/upper end 31F thereof, and a spring-biased hinge 31C along top/upper end 31F thereof. Spring-loaded primary/main flap 31 has a front side 31D facing away from trough section 106A, and a back side 31E facing toward trough section 106A.

Primary/main flap 31 (e.g., spring-loaded primary/main flap 31 of FIGS. 2A-6B or sole primary/main flap 31 of FIGS. 7A-7D described hereinbelow) can further comprise a tab, eyelet, loop, hole or void (e.g., a T-shaped void, as described hereinbelow with reference to FIG. 7A-FIG. 7D), or other attachment component 34 to which a force can be applied (e.g., via attachment of a tool) to open the primary/main flap 31. For example, such an attachment component 34 can be utilized to hold primary/main flap 31 open during sampling, washing, inspecting, etc. Attachment component 34 can be attached to bottom 31G of semicircular lower portion 31A of primary/main flap 31. Primary/main flap 31 can have an inside perimeter 31H. In the embodiment of FIG. 3A and FIG. 3B, inside perimeter 31H comprises a horizontal inside perimeter portion 31J and a curved inside perimeter lower portion 31I. In embodiments, attachment component 34 can be attached to inside perimeter 31H of (e.g., spring-loaded) primary/main flap 31. For example, the tab or other attachment component 34 can be attached to curved lower portion 31I of inside perimeter 31H of primary/main flap 31.

Discharge opening 33C of base plate 33 of the end tube seal/end adapter gasket 30 aligns with the discharge opening 22 provided by the end sheet 12, such that unimpeded material flow can be provided through end tube seal/end adapter gasket 30 when the (e.g., spring-loaded) primary/main flap 31 is in the open position, and material flow from trough 19 is prevented when primary/main flap 31 is in the closed position. Base plate 33 further defines a shaft opening 33H. The shaft opening 33H defined by the base plate 33 aligns with the shaft opening 20 provided by the end sheet 12, and, when assembled, the end 2A of the valve rod 2 extends through the shaft opening 33H. As depicted in the embodiment of FIG. 3A, discharge opening 22 provided by the end sheet 12 and the discharge opening 33C of the base plate 33 can be hemispherical in cross-section along bottom portions thereof. Discharge opening 33C of base plate 33 can be located in a lower portion of base plate 33, and shaft opening 33H in an upper half thereof, in embodiments. Base plate 33 (and end tube seal/end adapter gasket 30) can be installed substantially vertically, as indicate at V, from a top 33F to a bottom 33G of base plate 33, and have a front side 33D facing away from trough section 106A, and a back side 33E facing toward trough section 106A. Base plate 33 can comprise an upper/semicircular portion 33A and a lower/horizontal portion 33B, although other shapes are envisioned for base plate 33 and are within the scope of this disclosure.

Base plate 33 further comprises any number of bolt holes 331, through which one or more affixing members, e.g., hex bolts 6, can pass to affix base plate 33 (directly, as in the embodiment of FIG. 2A, or indirectly, as in the embodiment of FIG. 2B) to (e.g. front side or exterior of) end sheet 12. Base plate 33 of FIG. 3A and FIG. 3B comprises four bolt holes 331 and associated bolts passing therethrough can be utilized to affix base plate 33 to end sheet 12. A base plate 33 can comprise any number of bolt holes 331.

In embodiments, end tube seal/end adapter gasket 30 further comprises a secondary/bypass flap 32 coupled to a spring-loaded primary/main flap 31, or a mesh section (321 of FIG. 6A and FIG. 6B, described further hereinbelow) within primary/main flap 31. The secondary/bypass flap 32 and the mesh section 321 can be configured to enable venting. Alternatively, perforations in primary/main flap 31 can provide venting, as detailed hereinbelow with reference to FIGS. 7A-7D.

In FIG. 3A, end tube seal/end adapter gasket 30 comprises secondary/bypass flap 32. Secondary/bypass flap 32 comprises a semicircular/lower portion 32A extending from a bottom 32G thereof, and an horizontal upper portion 32B along a top 32F thereof. Although depicted in FIG. 3A with the top 32F of the secondary/bypass flap 32 comprising a horizontal upper portion 32B and a semicircular/lower portion 32A, it is envisioned that the horizontal upper portion 32B and semicircular/lower portion 32A of secondary/bypass flap 32 can have other shapes. Secondary/bypass flap 32 has a front side 32D facing away from trough section 106A, and a back side 32E facing toward trough section 106A.

As best seen in FIG. 3B, in the closed position, the secondary/bypass flap 32 overlaps an inside perimeter 31H of spring-loaded primary/main flap 31. In embodiments, the secondary/bypass flap 32 overlaps an inside perimeter 31H of spring-loaded primary/main flap 31 by a radial distance D2 in a range of from about 0.5 mm to about 5 mm, from about 1 mm to about to 5 mm, from about 2 mm to about 4 mm, or a radial distance of at least about 1, 2, 3, 4, or 5 mm.

Like spring-loaded primary/main flap 31, the secondary/bypass flap 32 can be spring-loaded. The secondary/bypass flap 32 can be spring-loaded via a spring-biased hinge 32C connected with top 32F of the secondary/bypass flap 32 and a back side 31E of an horizontal upper portion 31B of the spring-loaded primary/main flap 31. Although spring-loaded primary/main flap 31 is depicted with spring-biased hinge 31C at a top thereof, and secondary/bypass flap 32 depicted with spring-biased hinge 32C along a top 32F thereof, in alternative embodiments, spring-biased hinge 31C can be located on a bottom 31G of spring-loaded primary/main flap 31 or along a side thereof, and spring-biased hinge 32C can be located on a bottom 32G of secondary/bypass flap 32 or along a side thereof, so long as opening of the spring-loaded primary/main flap provides unimpeded flow of material out of trough 19.

The spring-loaded primary/main flap 31 and the secondary/bypass flap 32 (or mesh section 321, described hereinbelow with regard to FIG. 6 and FIG. 6B) can be made from a variety of suitable materials. The materials should be sturdy enough to prevent damage to or destruction of the spring-loaded primary/main flap 31 and the secondary/bypass flap 32 during use, and should further be inert to the pellets or other product being transported via hopper car 100 and transferred via the outlet gate/gate assembly 106. In embodiments, spring-loaded primary/main flap 31 and secondary/bypass flap 32 (or mesh section 321) are each independently made of a metal, or an elastomer. For example, in embodiments, spring-loaded primary/main flap 31 and secondary/bypass flap 32 (or mesh section 321) can be made from aluminum.

The spring-loaded primary/main flap 31 and the secondary/bypass flap 32 can be spring-loaded in opposite or reverse directions, whereby spring-biased spring 31C connecting the spring-loaded primary/main flap 31 to the base plate 33 biases the spring-loaded primary/main flap 31 in a direction A1 opposite a direction A2 in which spring-biased hinge 32C connecting the secondary/bypass flap 32 to the spring-loaded primary/main flap 31 biases the secondary/bypass flap 32. For example, as depicted in FIG. 3B, spring-biased spring 31C connecting spring-loaded primary/main flap 31 to base plate 33 biases back side 31E of the spring-loaded primary/main flap 31 toward base plate 33 and discharge opening 33C, and spring-biased hinge 32C connecting secondary/bypass flap 32 to spring-loaded primary/main flap 31 biases front side 32D of secondary/bypass flap 32 toward back side 31E of spring-loaded primary/main flap 31.

In embodiments such as that depicted in FIG. 2A, wherein end tube seal/end adapter gasket 30 is adjacent end sheet 12, back side 30B of the end tube seal/end adapter gasket 30 can be contoured to complement a contour of exterior 12A of end sheet 12, and a front side 30A of the end tube seal/end adapter gasket 30 can be contoured to complement a contour of a back end 3B of adapter 3, or both the back side 30B of the end tube seal/end adapter gasket 30 can be contoured to complement the contour of the exterior 12A of end sheet 12 and the front side 30A of the end tube seal/end adapter gasket 30 can be contoured to complement the contour of the back end 3B of adapter 3. In embodiments such as that depicted in FIG. 2B, wherein end tube seal/end adapter gasket 30 is positioned within adapter 3, back side 30B of the end tube seal/end adapter gasket 30 (e.g., gasket 3C) can be contoured to complement a contour of back end 3B, a front side 30A of the end tube seal/end adapter gasket 30 can be contoured to complement a contour of a front end 3A of adapter 3, or the back side 30B of the end tube seal/end adapter gasket 30 can be contoured to complement the contour of the back end 3B, and the front side 30A of the end tube seal/end adapter gasket 30 can be contoured to complement the front end 3A of adapter 3.

As best seen in FIG. 3B, in the closed position, spring-loaded primary/main flap 31 can overlap base plate 33. For example, spring-loaded primary/main flap 31 can overlap base plate 33 by a radial distance D1 in a range of from about 0.5 mm to about 5 mm, from about 1 mm to about to 5 mm, from about 2 mm to about 4 mm, or a radial distance of at least about 1, 2, 3, 4, or 5 mm.

Figure 4A:
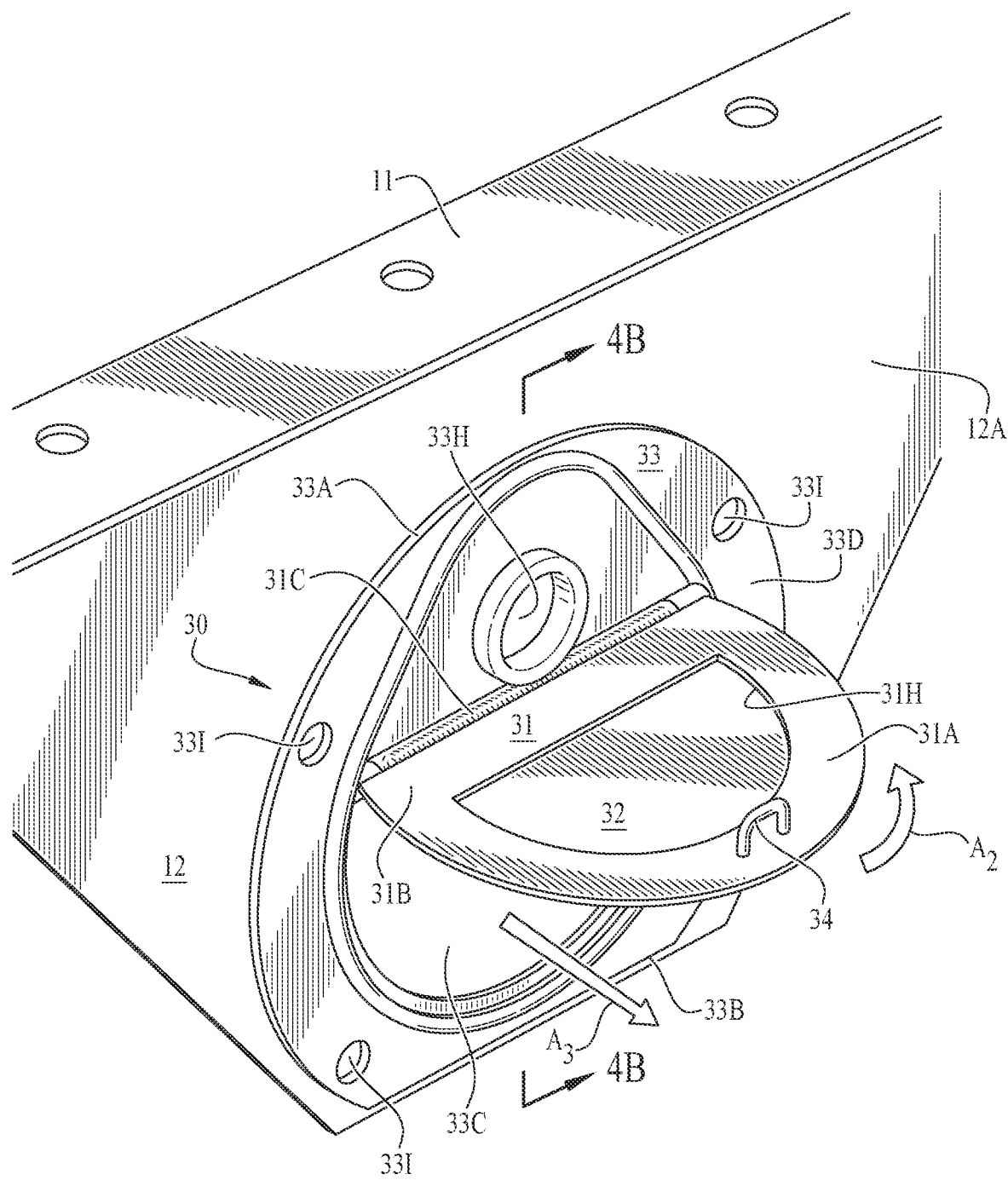
FIG. 4A is a schematic of the end tube seal/end adapter gasket of FIG. 3A, wherein the primary/main flap of the end tube seal/end adapter gasket is shown in an open position.
Figure 4B:
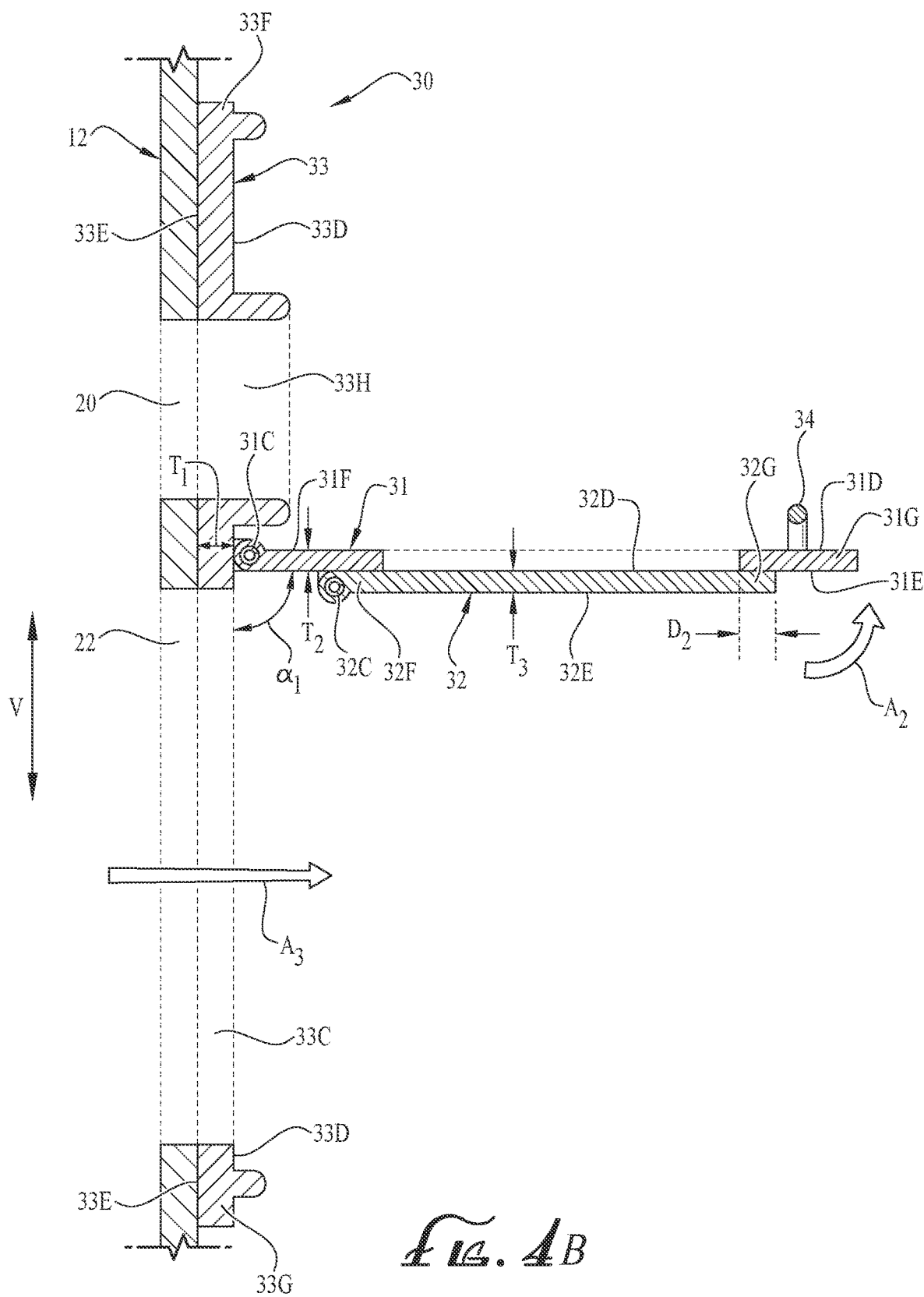
FIG. 4B is a side view of the end tube seal/end adapter gasket of FIG. 4A.

As seen in FIG. 4A, which is a schematic of the end tube seal/end adapter gasket 30 of FIG. 3A with the spring-loaded primary/main flap 31 of the end tube seal/end adapter gasket 30 shown in an open position, and FIG. 4B, which is a side view of the end tube seal/end adapter gasket 30 of FIG. 4A, during offloading of product, spring-loaded primary/main flap 31 opens in the direction indicated by arrow A2, allowing material to pass through discharge opening 22 of end sheet 12 and discharge opening 33C of base plate 33 into end tube/end adapter assembly 106B in the direction indicated by arrow A3. Spring-biased hinge 31C can be operable to allow spring-loaded primary/main flap 31 to open an angle α1 of greater than or equal to about 70, 80, 90°, or 100°. As spring-biased hinge 32C is biased toward spring-loaded primary/main flap 31, secondary/bypass flap 32 remains closed against spring-loaded primary/main flap 31. The opening angle α1 is not particularly limited, except that opening of spring-loaded primary/main flap 31 should allow unimpeded flow of material out of trough section 106A into the end tube/end adapter assembly 106B.

Figure 5A:
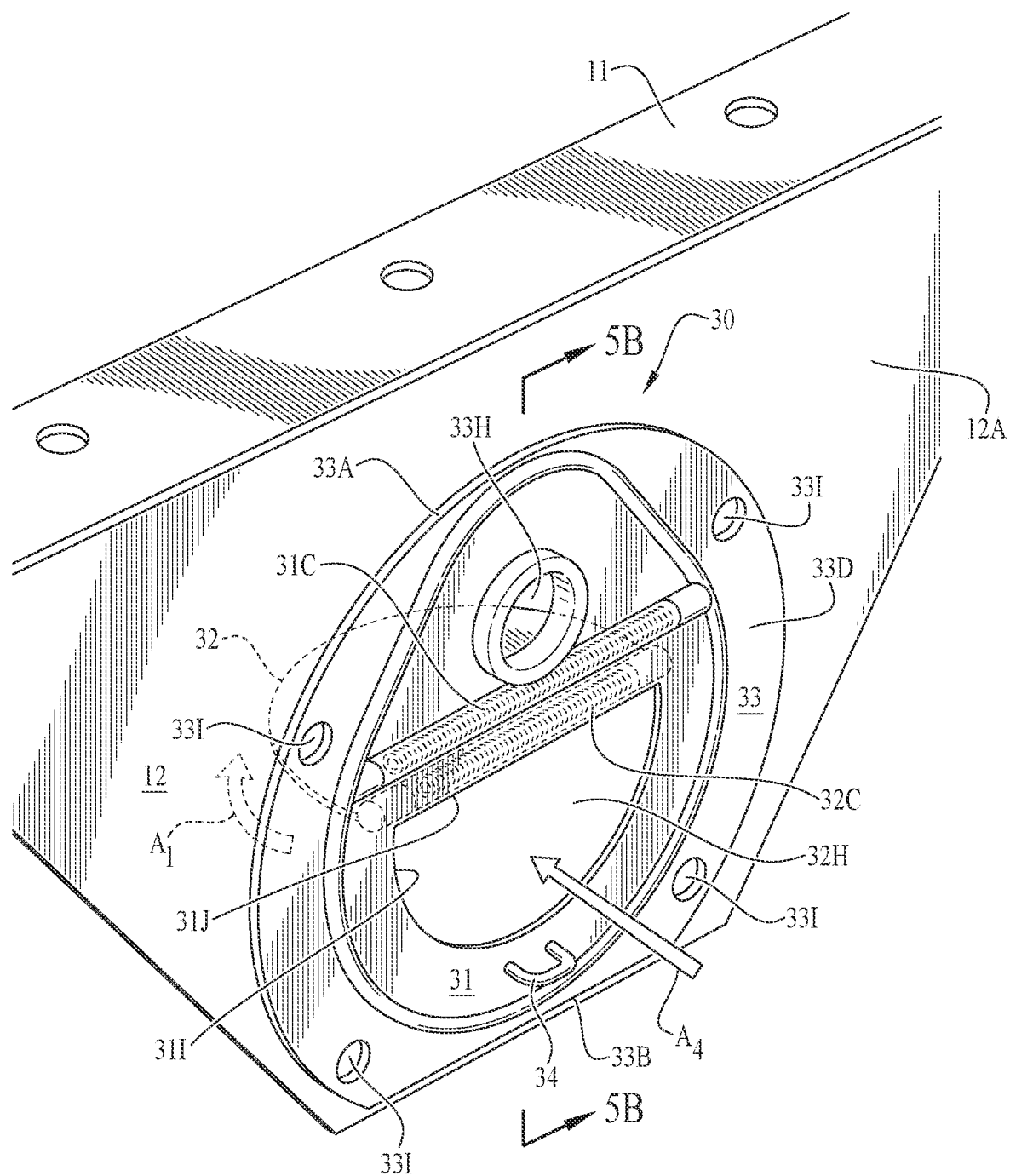
FIG. 5A is a schematic of the end tube seal/end adapter gasket of FIG. 3A, wherein the secondary/bypass flap of the end tube seal/end adapter gasket is shown in an open position.
Figure 5B:
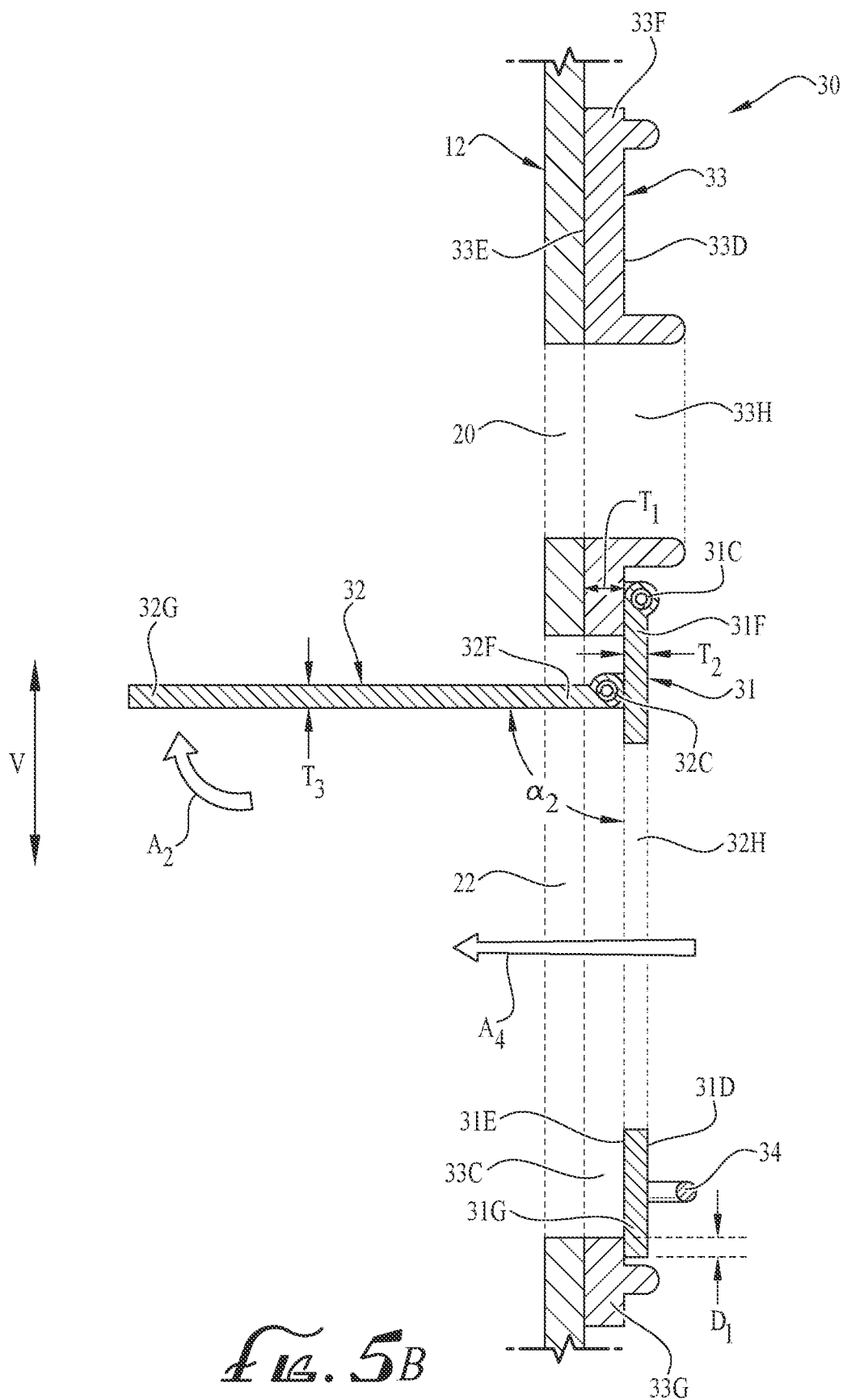
FIG. 5B is a side view of the end tube seal/end adapter gasket of FIG. 5A.

As seen in FIG. 5A, which is a schematic of the end tube seal/end adapter gasket 30 of FIG. 3A with the secondary/bypass flap 32 of the end tube seal/end adapter gasket 30 in an open position, and FIG. 5B, which is a side view of the end tube seal/end adapter gasket 30 of FIG. 5A, at times, such as during material transfer, secondary/bypass flap 32 can open via hinging in the direction indicated by arrow A1, such that material (e.g., gas) can pass through vent opening 32H provided by secondary/bypass flap 32, for example in a direction indicated by arrow A4.

Figure 6A:
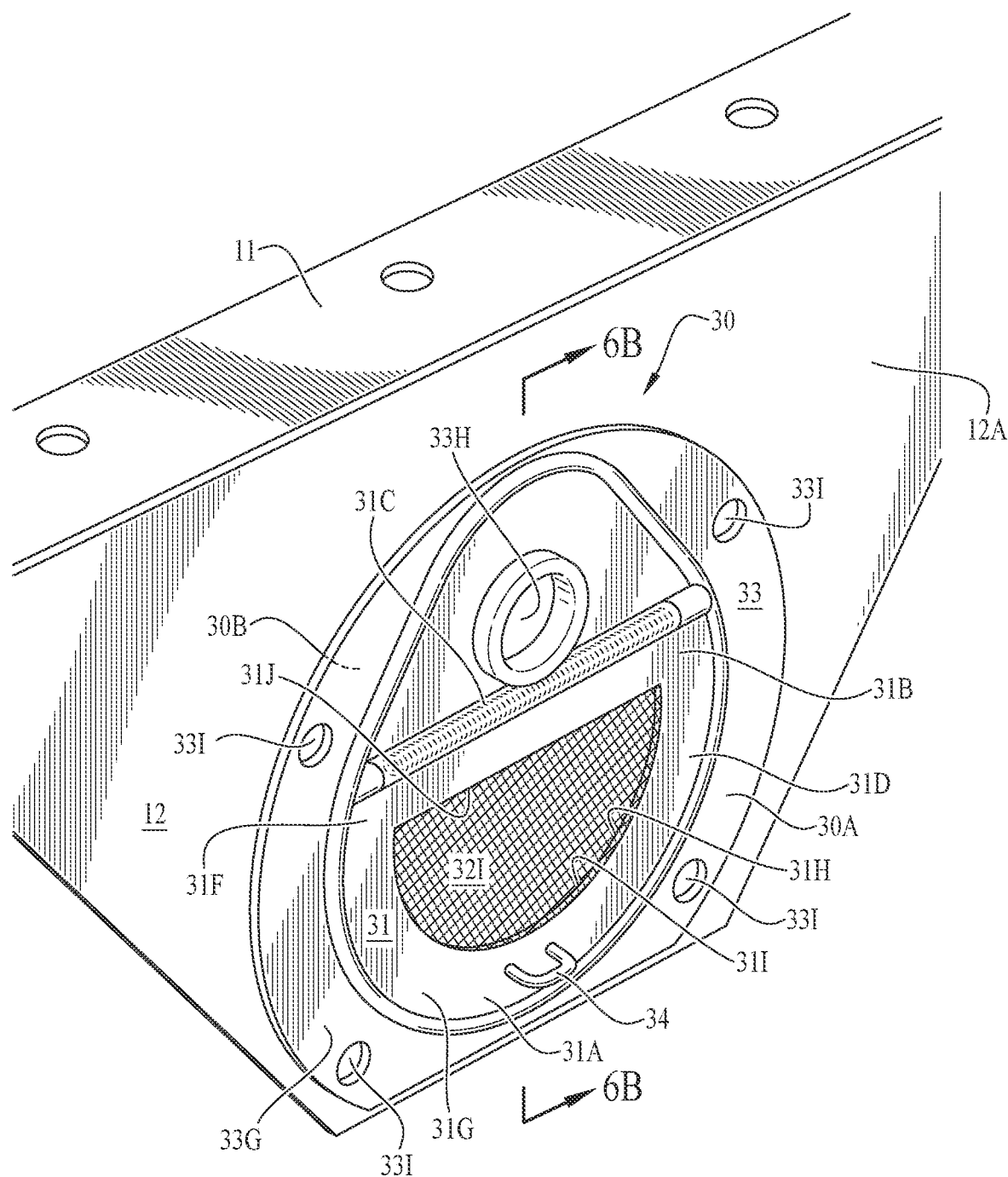
FIG. 6A is a schematic of an end tube seal/end adapter gasket according to embodiments of the present disclosure, wherein a sole primary/main flap of the end tube seal/end adapter gasket is shown in a closed position and comprises a mesh section.
Figure 6B:
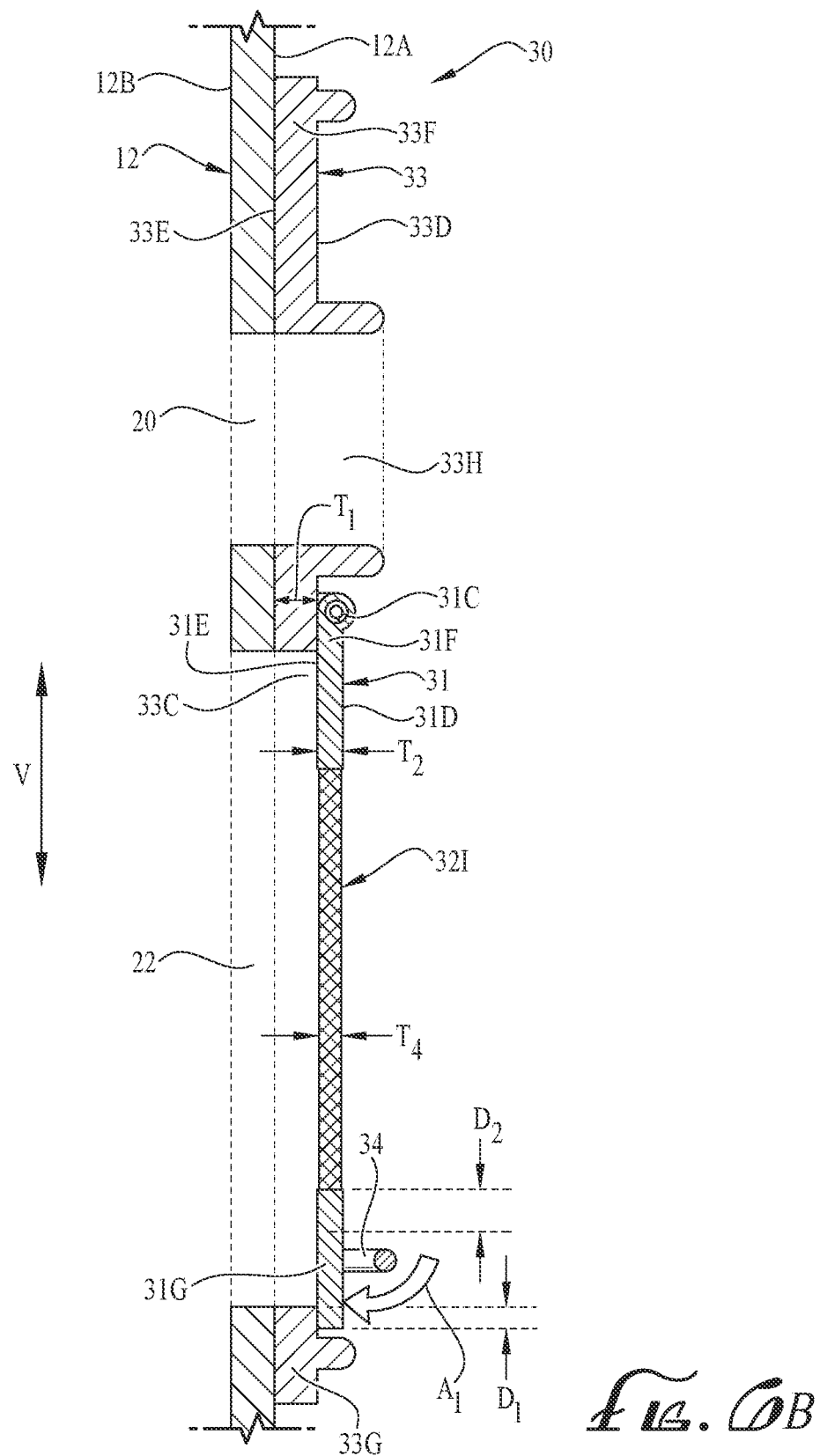
FIG. 6B is a side view of the end tube seal/end adapter gasket of FIG. 6A.

In some embodiments, a secondary/bypass flap 32 is not present. In some such embodiments, spring-loaded primary/main flap 31 is the sole flap of the end tube seal/end adapter gasket 30 and extends from top/upper end 31F to bottom 31G thereof. In some such alternative embodiments, a mesh section, a screen section, a perforated section, or other gas permeable/pellet impermeable barrier (321; see FIG. 6A and FIG. 6B) is positioned in vent opening 32H and/or sole main flap 31 comprises such a mesh section, a screen section, a perforated section, or other gas permeable/pellet impermeable barrier (e.g., is perforated with perforations, as shown in the embodiments FIG. 6A-FIG. 7B), to allow venting of gas, while retaining pellets, for example, during material transfer. For example, FIG. 6A is a schematic of an end tube seal/end adapter gasket according to an embodiment of the present disclosure, wherein the end tube seal/end adapter gasket 30 comprises a sole flap, being the spring-loaded primary/main flap 31, shown in a closed position in FIG. 6A. In this embodiment, a mesh section 321 is positioned within inside perimeter 31H of spring-loaded primary/main flap 31. FIG. 6B is a side view of the end tube seal/end adapter gasket of FIG. 6A, depicting the mesh section 321.

As noted hereinabove, in embodiments, end tube seal/end adapter gasket 30 comprises an integrated gasket 33 and a single or main flap as primary/main flap 31. Such embodiments will now be described with reference to FIG. 7A to 7D.

FIGS. 7A-7D depict various configurations of an end tube seal/end adapter gasket 30, in which base plate 33 is integrated with a single main flap 31. Sole primary/main flap 31 comprises a lower portion 31A extending from a bottom 31G thereof, a substantially horizontal upper portion 31B at a top/upper end 31F thereof, and a material hinge 31M along top/upper end 31F thereof. Lower cutout 31K defines lower portion 31A of primary/main flap 31. An upper cutout 31L, along with material sections or "hinges" 31M, defines an upper portion 31B of primary/main flap 31. As with the primary/main flaps 31 described hereinabove with reference to FIG. 3A to FIG. 6B, primary/main flap 31 of the integrated embodiments of FIG. 7A to FIG. 7D can have a substantially semispherical lower portion 31A and a substantially horizontal upper portion 31B. The material sections 31M can serve to allow opening of the primary/main flap 31 (e.g., via movement of bottom 31G of primary/main flap 31 away from base plate 33 and end sheet 12 of hopper car 100). In such a manner, primary/main flap 31 "hinges" at material sections 31M, which can thus also be referred to herein as "material hinges" 31M, although no separate mechanical hinge need be present. Although two material hinges 31M are depicted in FIGS. 7A-7D, any number of hinge sections 31M can be utilized. In the embodiments of FIGS. 7A-7D, hinge sections 31M each extend a distance along latitudinal central axis 35A of base plate 33/primary main flap 31 about a same distance as upper cutout 31L extends along latitudinal central axis 35A of base plate 33/primary main flap 31. The number and design of material hinges 31M and upper cutout 31L can be selected to allow opening of primary/main flap 31, while ensuring that primary/main flap 31 returns to a normally closed after unloading of trough 19 and provides long service life.

The shape of primary/main flap 31 can be designed to complement a shape of discharge opening 22 of end sheet 12, i.e., to allow maximum flow out of trough 19 upon discharge. The primary/main flap 31 can be perforated with perforations 32J to allow for air passage in a manner as described hereinabove with regard to secondary flap 32 of the embodiments of FIGS. 3A-5A and mesh section 321 of the embodiments of FIGS. 6A-6B. The perforations 32J can be distributed substantially continuously over primary/main flap 31. A distance between a top number of perforations 32J located closest to hinge sections 31M can be positioned a desired distance therefrom to provide sufficient hinge material in material hinges 31M to allow for primary/main flap 31 to assume the closed position (and thus maintain any pellets in trough 19) whenever a vacuum is not pulled on trough 19 or a tool is not attached to attachment 34 to force primary/main flap 31 in the open position.

The material from which end tube seal/end adapter gasket 30 is formed (e.g., stamped, cut, or otherwise formed), a length and positioning of upper cutout 31L, and a design of lower cutout 31K can be selected to provide sufficient force for primary/main flap 31 to return to a closed position (as depicted in FIGS. 7A to 7D), upon emptying of hopper car 100 or whenever primary/main flap 31 needs to be closed.

In embodiments, the end tube seal/end adapter gasket 30 is stamped, cut, or otherwise formed from a gasket material. The gasket material can be food grade or comprise a coating of a food grade material thereupon. In embodiments, the gasket material can be elastomeric. The material can have a temperature rating in a range of from about −20° C. to 130° C., −10° C. to 120° C., or −20° C. to 120° C. in embodiments. Although a single material provides for ease of production, in embodiments, the base plate 33 and the primary/main flap 31 can be formed of disparate materials, in embodiments.

As depicted in FIGS. 7A to 7D, attachment component 34, via which, as described hereinabove, primary/main flap 31 can be manually opened via attachment of a tool when desired (e.g., for taking of a sample of material from trough 19), can be a T-shaped cutout in primary/main flap 31. Other shapes, patterns, or numbers of holes or voids can be utilized for attachment 34. In embodiments, the T shape attachment 34 has a top 34A of the T shaped cutout in a curved lower portion 31A and a base 34B of the T shaped cutout directed away from the top 34A and toward bottom 31G of primary/main flap 31. The base of the T shaped cutout attachment 34 can be aligned along a longitudinal central axis of base plate 33/primary/main flap 31, in embodiments.

Base plate 33 has six bolt holes 331 and two shaft opening 33H. As with the embodiments of FIGS. 2A-6B, the number, positioning, and shape of the bolt holes 331 and shaft openings 33H can be configured to adapt to a specific rail/hopper cars 100 and specific shaft valves 16 and outlet gates/gate assemblies 106 (FIG. 1).

Figure 7A:
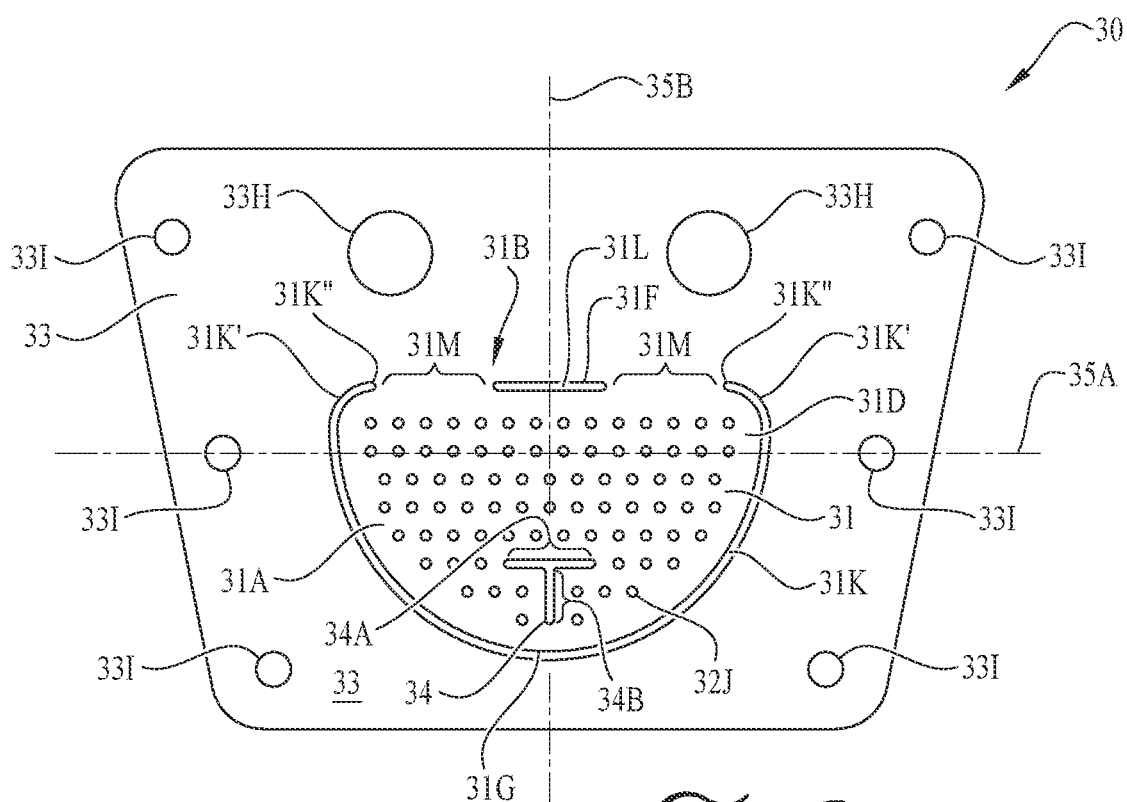
FIG. 7A is a schematic of an end tube seal/end adapter gasket according to embodiments of the present disclosure, wherein the end tube seal/end adapter gasket comprises a sole primary/main flap comprising a flexible material, shown in a closed position.
Figure 7B:
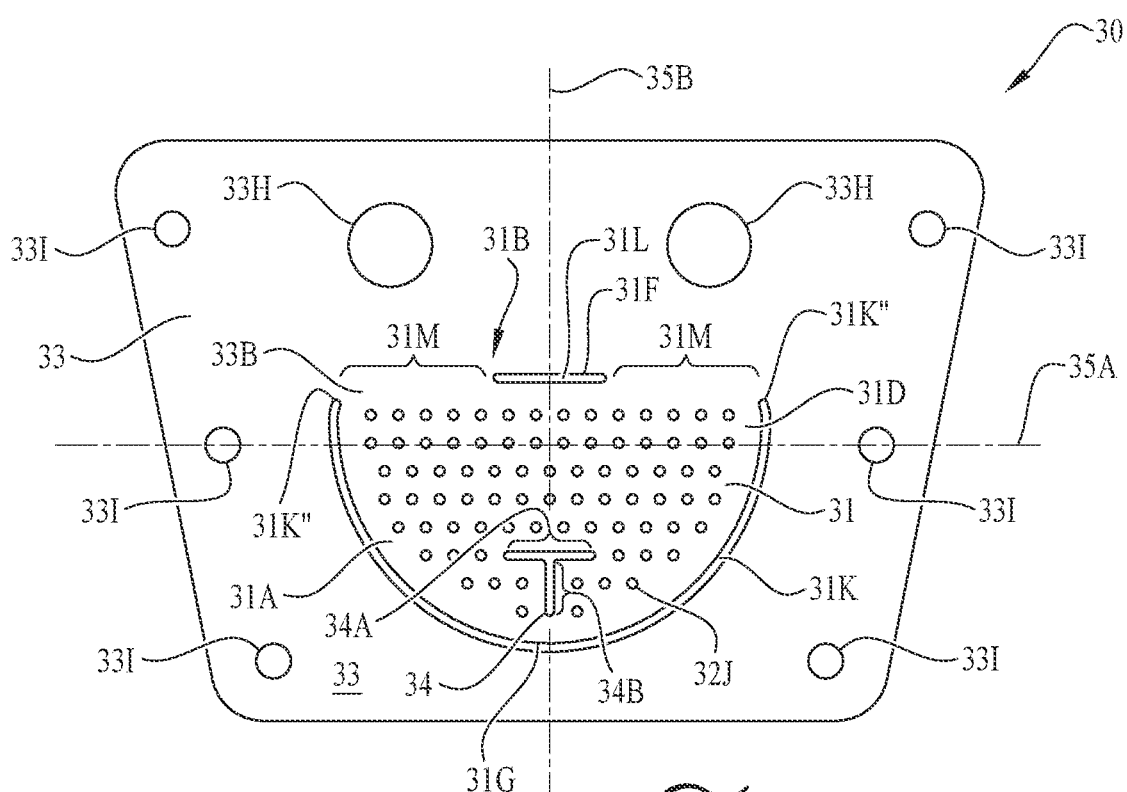
FIG. 7B is a schematic of an end tube seal/end adapter gasket according to embodiments of the present disclosure, wherein the end tube seal/end adapter gasket comprises a sole primary/main flap comprising a flexible material, shown in a closed position.
Figure 7C:
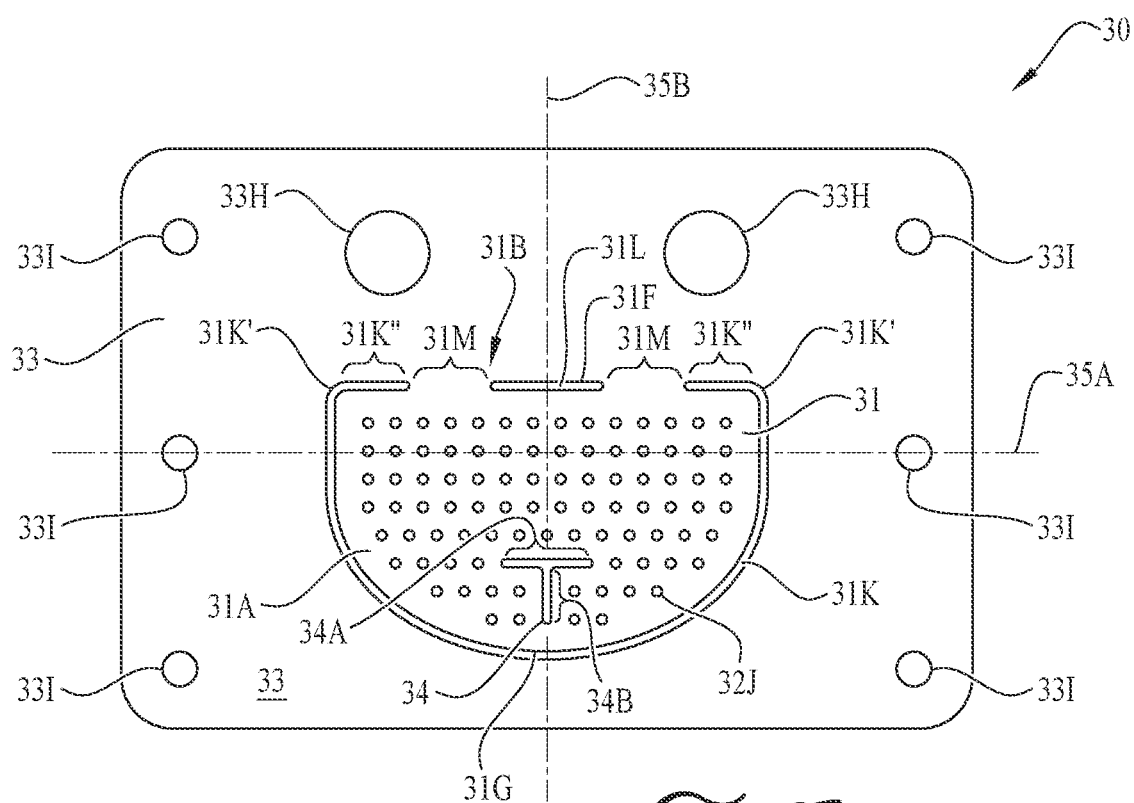
FIG. 7C is a schematic of an end tube seal/end adapter gasket according to embodiments of the present disclosure, wherein the end tube seal/end adapter gasket comprises a sole primary/main flap comprising a flexible material, shown in a closed position.
Figure 7D:
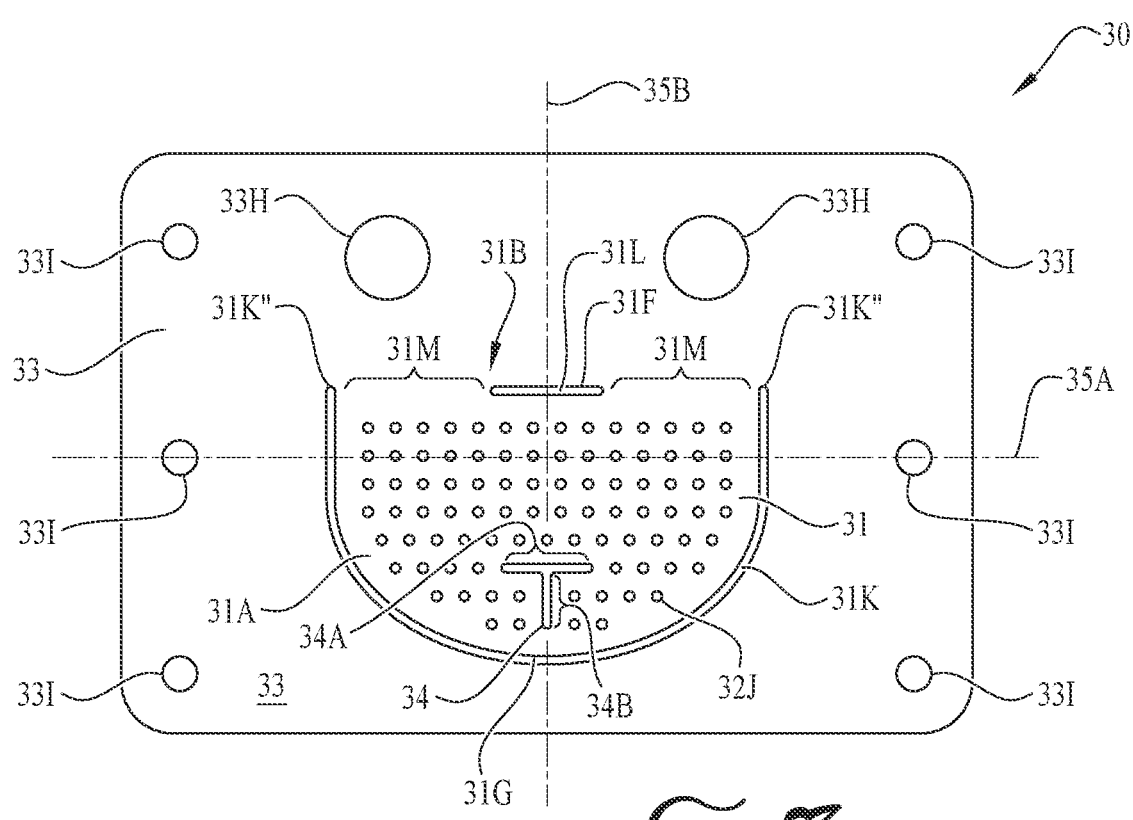
FIG. 7D is a schematic of an end tube seal/end adapter gasket according to embodiments of the present disclosure, wherein the end tube seal/end adapter gasket comprises a sole primary/main flap comprising a flexible material, shown in a closed position.

As depicted in the embodiment of FIG. 7A, lower cutout 31K can include an upper corner 31K' that curves back in toward longitudinal central axis 35B, such that ends 31K" of lower cutout 31K are in line with material section(s) 31M and upper cutout 31L, forming substantially horizontal upper portion 31B of primary/main flap 31. In alternative embodiments, such as depicted in FIG. 7B, lower cutout 31K does not include curved upper corners 31K'. In other embodiments, such as depicted in FIG. 7C, lower cutout 31K can include an upper corner 31K' that angles (e.g., at a substantially 90 degree angle) back in toward longitudinal central axis 35B, such that an ends 31K" of lower cutout 31K are in line with material section(s) 31M and upper cutout 31L, forming substantially horizontal upper portion 31B of primary/main flap 31. In other embodiments, such as depicted in FIG. 7D, lower cutout 31K has more of a "U" shape and may (or may not) include upper corners 31K' that angle or curve back in toward longitudinal central axis 35B. Primary/main flaps 31 having other shapes (e.g., non-curved lower portions 31A), upper corner 31K' designs, numbers of hinge sections 31M, attachment 34 designs, arrangements of perforations 32J, numbers and/or positioning of bolt holes 331 and shaft openings 33H are contemplated and intended to be within the scope of this disclosure.

Like the end tube seal/end adapter gaskets 30 of FIGS. 3A-6B, the integrated end tube seal/end adapter gaskets 30 embodiments of FIGS. 7A-7D, having integrated base plates 33 and single primary/main flaps 31 can be utilized in the rail/hopper cars 100 and/or the gates/gate assemblies 106 depicted in and described herein with reference to FIG. 1, FIG. 2A, and FIG. 2B.

Figure 8A:
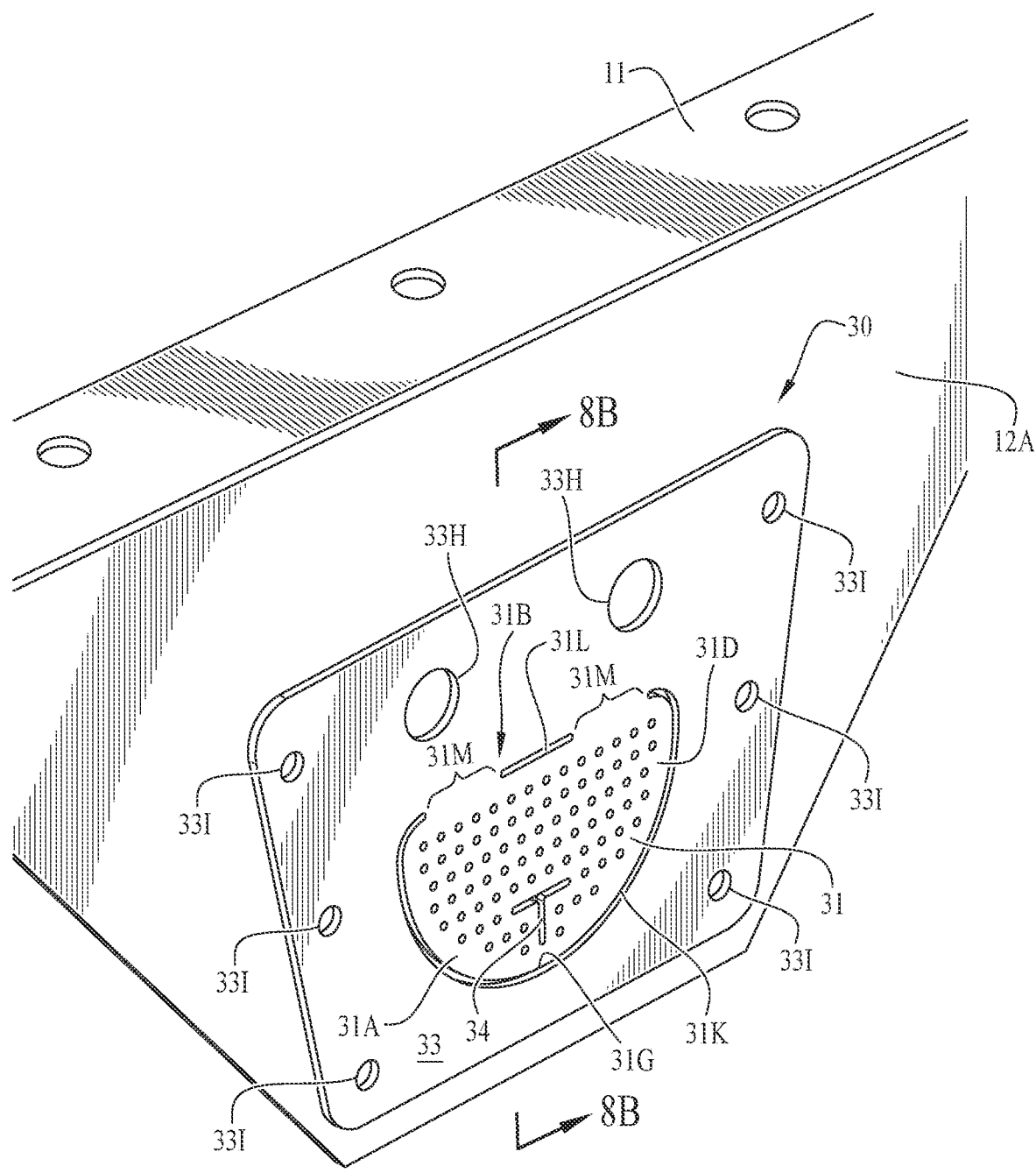
FIG. 8A is a schematic of the end tube seal/adapter gasket of FIG. 7A affixed to front or exterior side of a trough of a hopper car.

FIG. 8A is a schematic of the end tube seal/adapter gasket of FIG. 7A affixed to front or exterior side 12A of a trough 106A of a hopper car 100. Any of the end tube seal/adapter gaskets described herein can be positioned on a hopper car 100, as depicted in FIG. 8A. FIG. 8B is a side view of the end tube seal/adapter gasket 30 of FIG. 7A. Arrow A2 of FIG. 8B indicates the direction of movement of main flap 31 away from end sheet 12 to open the end tube seal/end adapter gasket 30 for cleaning, or product transfer (e.g., sampling or unloading).

The base plate 33 of FIG. 3A to FIG. 8B can have any suitable size for a given an outlet gate/gate assembly 106. In embodiments, base plate 33 can have a length (e.g., along latitudinal central axis 35A) in a range of from about 6 to about 12 inches (from about 15 to about 31 cm), from about 7 to about 10 inches (from about 17 to about 25.5 cm), or from about 6 to about 10 inches (from about 15 to about 25.5 cm), a width (e.g., along longitudinal central axis 35B) in a range of from about 6 to about 12 inches (from about 15 to about 31 cm), from about 7 to about 10 inches (from about 17 to about 25.5 cm), or from about 6 to about 10 inches (from about 15 to about 25.5 cm), and/or a base plate thickness (e.g., thickness T1 in FIG. 3B, FIG. 4B, FIG. 5B, FIG. 6B, FIG. 8B) in a range of from about 0.1 to about 0.5 inches (from about 0.25 to about 1.3 cm), from about 0.2 to about 0.5 inches (from about 0.5 to about 1.3 cm), or from about 0.2 to about 0.3 inches (from about 0.5 to about 0.8 cm). In embodiments, a thickness of primary/main flap 31 (e.g., thickness T2 in FIG. 3B, FIG. 4B, FIG. 5B, FIG. 6B, FIG. 8B), a thickness of secondary/bypass flap 32 (e.g., thickness T3 in FIG. 3B, FIG. 4B, FIG. 5B), a thickness of mesh section 321 (e.g., thickness T4 in FIG. 6B) can be in a range of from about 0.1 to about 0.5 inches (from about 0.25 to about 1.3 cm), from about 0.2 to about 0.5 inches (from about 0.5 to about 1.3 cm), or from about 0.2 to about 0.3 inches (from about 0.5 to about 0.8 cm). The thickness T2 of primary/main flap 31, the thickness T3 of secondary/bypass flap 32, and the thickness T4 of mesh section 321 can be selected to provide sufficient force to keep pellets in hopper car 100. With regard to thickness of primary/main flap 31 of FIG. 8B, for example, the thickness T2 of primary/main flap 31 in such embodiments and the material, and the design of the hinge sections 31M (e.g., length, size, and/or number thereof) can be selected to provide a desired force to maintain the primary/main flap 31 in the normally closed position and maintain pellets within hopper car 100.

In embodiments, a distance from bottom 31G of primary/main flap 31 and upper cutout 31K is from about 3 to about 6 inches (from about 7.6 to about 15.2 cm), from about 3.5 to about 6 inches (from about 8.9 to about 15.2 cm), or from about 4 to about 5 inches (from about 10.1 to about 12.7 cm). In embodiments, a distance across top 31F of primary/main flap 31 is in a range of from about 4 to about 12 inches (from about 10.2 to about 31 cm), from about 5 to about 10 inches (from about 12.7 to about 25.5 cm), or from about 6 to about 10 inches (from about 15 to about 25.5 cm). In embodiments, upper cutout 31K extends a length along latitudinal central axis 35A in a range of from about 0.25 to about 2 inches (from about 0.6 to about 5.1 cm), from about 0.5 to about 1.5 inches (from about 1.3 to about 3.8 cm), or from about 0.75 to about 1.25 inches (from about 1.9 to about 3.2 cm). In embodiments, top 34A and/or base 34B of T-shaped attachment component 34 can be in a range of from about 0.25 to about 2 inches (from about 0.6 to about 5.1 cm), from about 0.5 to about 1.5 inches (from about 1.3 to about 3.8 cm), or from about 0.75 to about 1.25 inches (from about 1.9 to about 3.2 cm). These values are given by way of example and are not intended to be limiting, as many configurations and sizes of an outlet gate/gate assemblies 106 can be fitted or retrofitted with end tube seal/end adapter gaskets 30 as described herein, and suitable design (sizing, material, etc.) of the end tube seal/end adapter gaskets 30 can, with the help of this disclosure, be readily determined by one of ordinary skill in the art.

As noted above, although depicted as having specific shapes in the Figures, discharge opening 22, primary/main flap 31 and optional secondary/bypass flap 32 can have a variety of shapes. For example, discharge opening 22 may be hemispherical, as depicted in FIG. 2A, but primary/main flap 31 and optional secondary/bypass flap 32 can be another shape, such as, without limitation, rectangular, trapezoidal, or the like, providing that closing of primary/main flap 31 completely impedes flow from trough section 106A via discharge opening 22, and, when present, opening of secondary/bypass flap or primary/main flap 31 itself allows venting, while not impeding desired material flow or allowing undesired material flow out of trough section 106A. In other embodiments, discharge opening 22 is not hemispherical. For example, by way of example, discharge opening 22 can be round. In some such embodiments, primary/main flap 31 may be, for example, round or hemispherical in shape. Alternative shapes for the discharge opening 22, the primary/main flap 31, and the secondary/bypass flap, when present, will be apparent to one of skill of the art upon reading this disclosure, and are intended to be within the scope of this disclosure.

Also disclosed herein is a method of preventing inadvertent product loss during transfer of material from and transport via a hopper car 100. The method comprising: replacing an end gasket of an outlet gate assembly with an end tube seal/end adapter gasket 30 as described hereinabove, or replacing an outlet gate/gate assembly with an outlet gate/gate assembly 106 of this disclosure comprising such an end tube seal/end adapter gasket 30.

In embodiments, a method of preventing inadvertent product loss during transfer of material from and transport via a hopper car 100, wherein the hopper car 100 comprises at least one outlet gate/gate assembly 106 as described hereinabove, comprises: loading, at a loading site, a hopper car 100 with material via one or more hatches 124, wherein, during the loading, each at least one outlet gate/gate assembly 106 of this disclosure is configured in a closed position (e.g., with a shaft valve 16 thereof in a closed position), the primary/main flap 31 of the end tube seal/end adapter gasket 30 of each end tube/end adapter assembly 106B is in the closed position, and the outlet cap 4 of each end tube/end adapter assembly 106B covers the end adapter 3 thereof. The method further comprises transferring the material in the hopper car 100 to an offloading site. Once at the offloading site, the method comprises transferring material from the hopper car 100. The material is transferred from the hopper car 100 by removing (if present) the outlet cap 4 from the end tube/end adapter assembly 106B attached to a first end 12' of trough section 106A of the at least one outlet gate/gate assembly 106 and attaching a pneumatic transfer hose therewith, opening (if closed) the outlet gate/gate assembly (e.g., opening shaft valve 16 via handles 18), and pneumatically transferring material from the trough section 106A of the at least one outlet gate/gate assembly 106. During the pneumatic transfer, the primary/main flap 31 of the end tube/end adapter assembly 106B on the first end 12' is open, and the primary/main flap 31 of the end tube/end adapter assembly 106B on a second end 12" of the trough section 106A opposite the first end 12' can be closed. In some embodiments, product can be simultaneously offloaded via the end tube/end adapter assembly 106B on both first end 12' and second end 12" of trough section 106A. In such embodiments, alternative venting can be provided.

The method further comprises, upon transfer of the desired amount of material (e.g., substantially all of the material within hopper car 100), discontinuing the pneumatic transferring, whereby the primary/main flap 31 on the end tube/end adapter assembly 106B on the first side 12' closes due to the bias provided by a material and/or spring-biased hinge 31C thereof, and optionally closing the outlet gate/gate assembly 106 (e.g., closing shaft valve 16 via handles 18 and/or replacing the outlet cap 4 over end adapter 3). Because primary/main flap 31 is configured to normally be in the closed position, any material inadvertently (or intentionally) left in the hopper car 100 will be maintained in the hopper car 100 via the end tube seal/end adapter gasket 30, even if the outlet gate/gate assembly 106 (e.g., a shaft valve 16 thereof) is inadvertently left open (or somehow opens during transport) and/or the outlet cap 4 is not positioned over end adapter 3 prior to (or comes off during) transport.

In embodiments, at least one or each end tube seal/end adapter gasket 30 further comprises a secondary/bypass flap 32 as described hereinabove, the secondary/bypass flap 32 coupled to the (e.g., spring-loaded) primary/main flap 31, or at least one or each end tube seal/end adapter gasket 30 comprises a mesh section 321 (as depicted in FIG. 6A-6B) or perforations 32J (as depicted in FIGS. 7A-7D) within the primary/main flap 31. In such embodiments, the method can further comprise, during the transferring, venting via opening of the secondary/bypass flap 32 or via the mesh section 321 or the perforations 32J on the second end 12".

The method can further comprise returning the hopper car 100 to the or another loading site; and washing the hopper car 100. The primary/main flap 31 can further comprise a tab or other attachment component 34, as described hereinabove, attached to (e.g., an inside perimeter 31H or semicircular lower portion 31A of, as depicted in FIGS. 3A-6B) or provided by (e.g., T shaped cutout attachment 34 of FIGS. 7A-7D) primary/main flap 31, to which a force can be applied to open the primary/main flap 31. In such embodiments, washing the hopper car 100 can comprise configuring each end tube seal/end adapter gasket 30 with the primary/main flap 31 thereof in an open position via the tab or other attachment component 34, such that the primary/main flap 31 is held open during the washing. Prior to washing, the troughs 19 and end tube/end adapter assembly(ies) 106B can be inspected for any product unintentionally left therein. If found, such unintentionally left product can be recovered and utilized in any manner deemed appropriate.

A hopper car 100 can be retrofit by replacing one or more end tube seal/end adapter gasket thereof with an end tube seal/end adapter gasket 30 of this disclosure. As the end tube seal/end adapter gasket 30 of this disclosure can be relatively simple (e.g., especially for the one piece integrated embodiments of FIGS. 7A-7D), installation and replacement can be quick and easy.

The product transported by the hopper car 100 and offloaded via the outlet gate/gate assembly is not particularly limited. In aspects, the product comprises plastic or resin pellets or nurdles, such as, without limitation, polymeric pellets, such as pellets comprising polypropylene, polyethylene, or the like. The pellets can have any shape, such as, for example, substantially spherical pellets, the loss of which to the environment can be particularly undesirable due to extended degradation times of such spherical pellets.

As noted hereinabove, the end tube seal/end adapter gasket 30 and outlet gate/gate assembly 106 comprising same according to this disclosure can help eliminate the environmental impact of lost product during product transport to an offloading site and return of the hopper car (e.g., with product inadvertently or intentionally remaining in the hopper car and/or outlet tube(s)) to a loading site. Increased revenue with more returned product, which can be provided via the end tube seal/end adapter gasket 30 and outlet gate/gate assembly 106 comprising the end tube seal/end adapter gasket 30, as described herein.

The hopper car outlet gate/gate assembly described herein comprises an end tube seal/end adapter gasket 30 having a mechanical flap (i.e., primary/main flap 31) on the outlet tube 3. The mechanical flap 31 can be sturdy and inert with regard to the pellets to be transferred (e.g., aluminum), and have a spring-biased hinge 31C or material hinge(s) 31M to assist in the opening and closing of the primary/main flap 31. The end tube seal/end adapter gasket 30 can be inserted between the outlet tube/end adapter 3 and the pan or trough section 106A or elsewhere within end tube/end adapter assembly 106B, as described hereinabove. In embodiments, a reversed or secondary/bypass flap 32 (FIGS. 3A-5B), mesh section 321 (FIGS. 6A-6B), or perforations 32J (FIGS. 7A-7D) can provide for ventilation during transfer of material from a hopper car 100 at an offloading site.

Additional Embodiments

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

In a first embodiment, an outlet gate/gate assembly 106 for a hopper car 100 comprises: a trough section 106A, wherein the trough section 106A comprises, opposing slanted sheets 10 and an end sheet 12 at each end of the opposing slanted sheets 10, wherein the trough section 106A defines a trough 19, and wherein each end sheet 12 provides a discharge opening 22 fluidly connected with the trough 19, and a shaft opening 20; and an end tube/end adapter assembly 106B fluidly connected with each end sheet 12, wherein the end tube/end adapter assembly 106B comprises an end adapter 3, an outlet cap 4, and an end tube seal/end adapter gasket 30, wherein the end tube seal/end adapter gasket 30 is positioned between the end sheet 12 and the end adapter 3, wherein the end tube seal/end adapter gasket 30 comprises a base plate 33 and a primary/main flap 31, wherein the base plate 33 defines a discharge opening 33C, and wherein the primary/main flap 31 is biased such that, in a closed position, the primary/main flap 31 completely covers the discharge opening 33C.

A second embodiment can include the outlet gate/gate assembly of the first embodiment, wherein the trough section 106A further comprises a shaft valve 16, wherein the trough 19 is below the shaft valve 16, wherein each end sheet 12 further comprises a shaft opening 20 through which an end 2A of a valve rod 2 of shaft valve 16 extends, and/or wherein end adapter 3 comprises a hole 3D through which an end 2A of valve rod 2 of shaft valve 16 extends.

A third embodiment can include the outlet gate/gate assembly 106 of the first or second embodiments, wherein the outlet gate/gate assembly is pneumatic.

A fourth embodiment can include the outlet gate/gate assembly 106 of any one of the first to third embodiments, wherein the primary/main flap is a spring-loaded primary/main flap 31 that comprises a spring-biased hinge 31C along a top/upper end 31F thereof, and wherein the spring-loaded primary/main flap is biased such that, in the closed position, the spring-loaded primary/main flap completely covers the discharge opening.

A fifth embodiment can include the outlet gate/gate assembly 106 of any one of the first to fourth embodiments, wherein the top/upper end 31F of the primary/main flap 31 comprises a horizontal upper portion 31B.

A sixth embodiment can include the outlet gate/gate assembly 106 of the fifth embodiment, wherein the primary/main flap 31 further comprises a semicircular lower portion 31A.

A seventh embodiment can include the outlet gate/gate assembly 106 of any one of the first to sixth embodiments, wherein the base plate 33 aligns with the discharge opening 22 provided by the end sheet 12 when the primary/main flap 31 is in the closed position.

An eighth embodiment can include the outlet gate/gate assembly 106 of any one of the first to seventh embodiments, wherein the base plate 33 further defines a shaft opening 33H, wherein the shaft opening 33H defined by the base plate 33 aligns with the a shaft opening 20 provided by the end sheet 12, and wherein an end 2A of a valve rod 2 of a valve shaft 16 extends through the shaft opening 33H defined by the base plate 33 and the shaft opening 20 provided by the end sheet 12 and optionally through a hole 3D in end adapter 3.

A ninth embodiment can include the outlet gate/gate assembly 106 of any one of the first to eighth embodiments, wherein the discharge opening 22 provided by the end sheet 12 and the discharge opening 33C of the primary/main flap 31 are substantially hemispherical in cross-section along bottom portions thereof.

A tenth embodiment can include the outlet gate/gate assembly 106 of any one of the first to ninth embodiments, wherein the primary/main flap is a spring-loaded primary/main flap and wherein the end tube seal/end adapter gasket 30 further comprises a secondary/bypass flap 32 coupled to the spring-loaded primary/main flap 31, or wherein the primary/main flap further comprises perforations 32J or a mesh section 32I within the spring-loaded primary/main flap 31, wherein the secondary/bypass flap 32, the perforations 32J, and the mesh section 32I are configured to enable venting.

An eleventh embodiment can include the outlet gate/gate assembly 106 of the tenth embodiment, comprising the secondary/bypass flap 32, wherein, in the closed position, the secondary/bypass flap 32 overlaps an inside perimeter 31H of spring-loaded primary/main flap 31 (e.g., by a radial distance (D2) in a range of from about 0.5 mm to about 5 mm, from about 1 mm to about to 5 mm, from about 2 mm to about 4 mm, or at least about 1, 2, 3, 4, or 5 mm.

A twelfth embodiment can include the outlet gate/gate assembly 106 of any one of the tenth or eleventh embodiments, comprising the secondary/bypass flap 32, wherein the secondary/bypass flap 32 is spring-loaded.

A thirteenth embodiment can include the outlet gate/gate assembly 106 of the twelfth embodiment, wherein the secondary/bypass flap 32 is spring-loaded via a spring-biased hinge 32C connected with a top 32F of the secondary/bypass flap 32 and a back side 31E of an horizontal upper portion 31B of the spring-loaded primary/main flap 31.

A fourteenth embodiment can include the outlet gate/gate assembly 106 of the thirteenth embodiment, wherein the top 32F of the secondary/bypass flap 32 comprises a horizontal upper portion 32B.

A fifteenth embodiment can include the outlet gate/gate assembly 106 of any one of the twelfth to fourteenth embodiments, wherein the spring-loaded primary/main flap 31 and the secondary/bypass flap 32 are each independently made of a metal or an elastomer.

A sixteenth embodiment can include the outlet gate/gate assembly 106 of any one of the twelfth to fifteenth embodiments, wherein the spring-loaded primary/main flap 31 and the secondary/bypass flap 32 are spring-loaded in opposite directions, whereby a spring-biased hinge 31C connecting the spring-loaded primary/main flap 31 to the base plate 33 biases the spring-loaded primary/main flap 31 in a direction A1 opposite a direction A2 in which a spring-biased hinge 32C connecting the secondary/bypass flap 32 to the spring-loaded primary/main flap 31 biases the secondary/bypass flap 32.

A seventeenth embodiment can include the outlet gate/gate assembly 106 of the sixteenth embodiment, wherein the spring-biased hinge 31C connecting the spring-loaded primary/main flap 31 to the base plate 33 biases a back side 31E of the spring-loaded primary/main flap 31 toward base plate 33 and discharge opening 33C, and wherein the spring-biased hinge 32C connecting the secondary/bypass flap 32 to the spring-loaded primary/main flap 31 biases a front side 32D of the secondary/bypass flap 32 toward a back side 31E of spring-loaded primary/main flap 31.

An eighteenth embodiment can include the outlet gate/gate assembly 106 of any one of the first to seventeenth embodiments, wherein the primary/main flap 31 further comprises a tab or other attachment component provided by or attached to the primary/main flap 31, to which a force can be applied to open the primary/main flap 31.

A nineteenth embodiment can include the outlet gate/gate assembly 106 of any one of the first to eighteenth embodiments, wherein the tab or other attachment component is attached to a curved lower portion 311 of the primary/main flap 31.

A twentieth embodiment can include the outlet gate/gate assembly 106 of any one of the first to nineteenth embodiments, wherein the base plate 33 comprises bolt holes 331 and bolts passing therethrough by which base plate 33 is affixed to end sheet 12.

A twenty first embodiment can include the outlet gate/gate assembly 106 of any one of the first to twentieth embodiments, wherein a front side 30A of the end tube seal/end adapter gasket 30 is contoured to complement a contour of an exterior 12A of end sheet 12, wherein a back side 30B of the end tube seal/end adapter gasket 30 is contoured to complement a contour of a back end 3B of adapter 3, or both wherein the front side 30A of the end tube seal/end adapter gasket 30 is contoured to complement the contour of the exterior 12A of end sheet 12 and wherein the back side 30B of the end tube seal/end adapter gasket 30 is contoured to complement the contour of the back end 3B of adapter 3.

A twenty second embodiment can include the outlet gate/gate assembly 106 of any one of the first to twenty first embodiments, wherein, in the closed position, the primary/main flap 31 overlaps base plate 33 (e.g., by a radial distance (D1) in a range of from about 0.5 mm to about 5 mm, from about 1 mm to about to 5 mm, from about 2 mm to about 4 mm, or at least about 1, 2, 3, 4, or 5 mm, or wherein the base plate and the primary/main flap are integrated.

A twenty third embodiment can include the outlet gate/gate assembly 106 of anyone of the first to twenty second embodiments, wherein the base plate 33 and the primary/main flap 31 are integrated, wherein the primary/main flap 31 is defined by a lower cutout 31K and an upper cutout 31L in the base plate 33 and a plurality of material hinge sections 31M along an upper portion 31B of the primary/main flap 31, wherein the primary/main flap 31 is perforated by perforations 32J, and wherein the primary/main flap 31 returns to the normally closed position due to a force provided by the material hinge sections 31M.

A twenty fourth embodiment can include the outlet gate/gate assembly 106 of anyone of the first to twenty third embodiments, wherein the end tube seal/end adapter gasket 30 is stamped, cut, or otherwise formed from a gasket material.

A twenty fifth embodiment can include the outlet gate/gate assembly 106 of anyone of the first to twenty fourth embodiments, wherein the gasket material is food grade or comprises a coating of a food grade material thereupon.

A twenty sixth embodiment can include the outlet gate/gate assembly 106 of anyone of the first to twenty fifth embodiments, wherein the gasket material is elastomeric.

A twenty seventh embodiment can include the outlet gate/gate assembly 106 of anyone of the first to twenty sixth embodiments further comprising an attachment component 34 to which a force can be applied to open the primary/main flap 31.

A twenty eighth embodiment can include the outlet gate/gate assembly 106 of anyone of the first to twenty seventh embodiments, wherein the attachment component 34 comprises a cutout in the primary/main flap 31, via which a tool can be utilized open the primary/main flap 31.

A twenty ninth embodiment can include the outlet gate/gate assembly 106 of anyone of the first to twenty eighth embodiments, wherein the cutout is a T-shaped cutout.

A thirtieth embodiment can include the outlet gate/gate assembly 106 of anyone of the first to twenty ninth embodiments, wherein the lower cutout 31K is substantially hemispherical and comprises rounder corners 31K' at a top 31F of the primary/main flap 31, and wherein the upper cutout 31L is separated from ends 31K" of the rounder corners 31K' by the material hinge sections 31M.

In a thirty first embodiment, an end tube seal/end adapter gasket 30 of an outlet gate/gate assembly 106 for a hopper car 100: a base plate 33 and a primary/main flap 31, wherein the base plate 33 defines a discharge opening 33C, and wherein the primary/main flap 31 is configured such that, in a normal closed position, the primary/main flap 31 completely covers the discharge opening 33C.

In a thirty second embodiment, an outlet gate/gate assembly 106 for a hopper car 100 comprises: a trough section 106A, wherein the trough section 106A comprises (optionally a shaft valve 16) opposing slanted sheets 10 and an end sheet 12 at each end of the opposing slanted sheets 10, wherein the trough section 106A defines a trough 19 (optionally below the shaft valve 16), and wherein each end sheet 12 provides a discharge opening 22 fluidly connected with the trough 19 (and optionally a shaft opening 20 through which an end 2A of a valve rod 2 of shaft valve 16 extends); and an end tube/end adapter assembly 106B fluidly connected with each end sheet 12 of the trough section 106A, wherein the end tube/end adapter assembly 106B comprises an end adapter 3, an outlet cap 4, and an end tube seal/end adapter gasket 30 of the thirty first embodiment, wherein the end tube seal/end adapter gasket 30 is positioned between the end sheet 12 and the end adapter 3.

In a thirty third embodiment, a method of preventing inadvertent product loss during transfer of material from and transport via a hopper car 100 comprises: replacing an end gasket of an outlet gate/gate assembly with an end tube seal/end adapter gasket 30 of any one of the first to the thirty first embodiments.

In a thirty fourth embodiment, a method of preventing inadvertent product loss during transfer of material from and transport via a hopper car 100, wherein the hopper car 100 comprises at least one outlet gate/gate assembly 106 of any one of the first to thirty first embodiments, comprises: loading, at a loading site, a hopper car 100 with material via one or more hatches 124, wherein, during the loading, each at least one outlet gate/gate assembly 106 is configured in a closed configuration (e.g., with a shaft valve 16 in a closed position), the spring-loaded primary/main flap 31 of the end tube seal/end adapter gasket 30 of each end tube/end adapter assembly 106B in the closed position, and the outlet cap 4 of each end tube/end adapter assembly 106B covering the end adapter 3 thereof; transporting the material in the hopper car 100 to an offloading site; transferring material from the hopper car 100 by: removing the outlet cap 4 from the end tube/end adapter assembly 106B attached to a first end 12' of trough section 106A of the at least one outlet gate/gate assembly 106 and attaching a pneumatic transfer hose therewith, opening (if closed) the outlet gate/gate assembly 106 (e.g., opening a shaft valve 16 via handles 18), and pneumatically transferring material from the trough section 106A of the at least one outlet gate/gate assembly 106, wherein, during the pneumatic transfer, the primary/main flap 31 of the end tube/end adapter assembly 106B on the first end 12' is open, and the primary/main flap 31 of the end tube/end adapter assembly 106B on a second end 12" of the trough section 106A opposite the first end 12' is closed; and discontinuing the pneumatic transferring, whereby the primary/main flap 31 on the end tube/end adapter assembly 106B on the first side 12' closes due to bias provided by a material of the primary/main flap or a spring-biased hinge 31C thereof, and optionally closing the outlet gate/gate assembly 106 (e.g., closing a shaft valve 16 via the handles 18 and/or replacing the outlet cap 4 over end adapter 3).

A thirty fifth embodiment can include the method of the thirty fourth embodiment, wherein the primary main flap is a spring-loaded primary/main flap and wherein each end tube seal/end adapter gasket 30 further comprises a secondary/bypass flap 32 coupled to the spring-loaded primary/main flap 31 or wherein the primary main flap is perforated with perforations 32J or includes a mesh section 32I within the spring-loaded primary/main flap 31, and wherein, during the transferring, venting is provided via opening of the secondary/bypass flap 32 or via the perforations 32J or mesh section 32I on the second end 12".

A thirty sixth embodiment can include the method of the thirty fourth or thirty fifth embodiment further comprising: returning the hopper car 100 to the or another loading site; and washing the hopper car 100.

A thirty seventh embodiment can include the method of the thirty sixth embodiment, wherein the primary/main flap 31 further comprises a tab or other attachment component, attached to the primary/main flap 31, to which a force can be applied to open the primary/main flap 31, and wherein washing the hopper car 100 comprises configuring each end tube seal/end adapter gasket 30 with the primary/main flap 31 thereof in an open position via the tab or other attachment component.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention. Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. An outlet gate/gate assembly for a hopper car, the outlet gate/gate assembly comprising:
  a trough section, wherein the trough section comprises opposing slanted sheets and an end sheet at each end of the opposing slanted sheets, wherein the trough section defines a trough, and wherein each end sheet provides a trough discharge opening fluidly connected with the trough; and
  an end tube/end adapter assembly fluidly connected with each end sheet, wherein the end tube/end adapter assembly comprises an end adapter, an outlet cap, and an end tube seal/end adapter gasket, wherein the end tube seal/end adapter gasket is positioned between the end sheet and the end adapter, wherein the end tube seal/end adapter gasket comprises a base plate and a primary/main flap, wherein the base plate defines a gasket discharge opening, and wherein the primary/main flap is connected to the base plate and configured such that, in a closed position, the primary/main flap completely covers the gasket discharge opening, wherein the outlet cap is positioned on a first side of the end adapter that is opposite of a second side where the end tube seal/end adapter gasket is positioned.

2. The outlet gate/gate assembly of claim 1, wherein the primary/main flap is a spring-loaded primary/main flap that comprises a spring-biased hinge along a top/upper end thereof, wherein the top/upper end of the spring-loaded primary/main flap comprises a substantially horizontal upper portion, and/or wherein the spring-loaded primary/main flap further comprises a semi-circular lower portion, and wherein the spring-loaded primary/main flap is biased such that, in the closed position, the spring-loaded primary/main flap completely covers the gasket discharge opening.

3. The outlet gate/gate assembly of claim 1, wherein the gasket discharge opening of the base plate aligns with the trough discharge opening provided by the end sheet.

4. The outlet gate/gate assembly of claim 1, wherein the primary/main flap is a spring-loaded primary/main flap and wherein the end tube seal/end adapter gasket further comprises a secondary/bypass flap coupled to the spring-loaded primary/main flap, or wherein the primary/main flap further comprises perforations or a mesh section within the primary/main flap, wherein the secondary/bypass flap, the perforations, and the mesh section are configured to enable venting.

5. The outlet gate/gate assembly of claim 4, wherein the secondary/bypass flap is spring-loaded.

6. The outlet gate/gate assembly of claim 5, wherein the spring-loaded primary/main flap and the secondary/bypass flap are spring-loaded in opposite directions, whereby a first spring-biased hinge connecting the spring-loaded primary/main flap to the base plate biases the spring-loaded primary/main flap in a direction opposite a direction in which a second spring-biased hinge connecting the secondary/bypass flap to the spring-loaded primary/main flap biases the secondary/bypass flap.

7. The outlet gate/gate assembly of claim 6, wherein the first spring-biased hinge connecting the spring-loaded primary/main flap to the base plate biases a back side of the spring-loaded primary/main flap toward the base plate and the gasket discharge opening, and wherein the second spring-biased hinge connecting the secondary/bypass flap to the spring-loaded primary/main flap biases a front side of the secondary/bypass flap toward the back side of the spring-loaded primary/main flap.

8. The outlet gate/gate assembly of claim 1, wherein a front side of the end tube seal/end adapter gasket is contoured to complement a contour of a front of the end sheet, wherein a back side of the end tube seal/end adapter gasket is contoured to complement a contour of a back of the end adapter, or both wherein the front side of the end tube seal/end adapter gasket is contoured to complement the contour of the front of the end sheet and wherein the back side of the end tube seal/end adapter gasket is contoured to complement the contour of the back of the end adapter.

9. The outlet gate/gate assembly of claim 1, wherein, in the closed position, the primary/main flap overlaps the base plate or wherein the base plate and the primary/main flap are integrated.

10. The outlet gate/gate assembly of claim 1, wherein the base plate and the primary/main flap are integrated, wherein the gasket discharge opening is defined by a lower cutout and an upper cutout in the base plate and a plurality of material hinge sections along an upper portion of the primary/main flap, wherein the primary/main flap is perforated, and wherein the primary/main flap returns to the closed position due to a force provided by the plurality of material hinge sections.

11. The outlet gate/gate assembly of claim 1, wherein the end tube seal/end adapter gasket is stamped, cut, or otherwise formed from a gasket material.

12. The outlet gate/gate assembly of claim 1, wherein the gasket discharge opening is defined by a lower cutout and an upper cutout in the base plate and a plurality of material hinge sections along an upper portion of the primary/main flap, wherein the lower cutout is substantially semicircular and comprises rounder corners at a top of the primary/main flap, and wherein the upper cutout is separated from ends of the rounder corners by the plurality of material hinge sections.

13. A method of preventing inadvertent product loss during transfer of material from and transport via a hopper car, wherein the hopper car comprises at least one outlet gate/gate assembly of claim 1, the method comprising:
 loading, at a loading site, the hopper car with material via one or more hatches, wherein, during the loading, each at least one outlet gate/gate assembly of claim 1 is configured in a closed position, the primary/main flap of the end tube seal/end adapter gasket of each end tube/end adapter assembly in the closed position, and the outlet cap of each end tube/end adapter assembly covering the end adapter thereof;
 transporting the material in the hopper car to an offloading site;
 transferring material from the hopper car from the hopper car by:
 removing the outlet cap from the end tube/end adapter assembly attached to both a first end and a second end opposite the first end of the trough section of the at least one outlet gate/gate assembly and attaching a pneumatic transfer hose to the end tube/end adapter assembly attached the first end, and pneumatically transferring material from the trough section of the at least one outlet gate/gate assembly, wherein, during the pneumatic transfer, the primary/main flap of the end tube/end adapter assembly on the first end is open, and the primary/main flap of the end tube/end adapter assembly on the second end of the trough section opposite the first end is closed; and
 discontinuing the pneumatic transferring, whereby the primary/main flap on the end tube/end adapter assembly on the first end closes due to bias provided by a material of the primary/main flap or a spring-biased hinge thereof, and optionally replacing the outlet cap over the end adapter.

14. The method of claim 13, wherein the primary/main flap is a spring-loaded primary/main flap and wherein each end tube seal/end adapter gasket further comprises a secondary/bypass flap coupled to the spring-loaded primary/main flap, or wherein the primary/main flap is perforated with perforations or includes a mesh section within the primary/main flap, and wherein, during the transferring, venting is provided via opening of the secondary/bypass flap or via the perforations or the mesh section on the second end.

15. The method of claim 13, further comprising:
returning the hopper car to the loading site or to another loading site; and
washing the hopper car.

16. The method of claim 15, wherein the primary/main flap further comprises a tab or other attachment component, attached to the primary/main flap, to which a force can be applied to open the primary/main flap, and wherein washing the hopper car comprises configuring each end tube seal/end adapter gasket with the primary/main flap thereof in an open position via the tab or other attachment component.

17. The outlet gate/gate assembly of claim 1, wherein the primary/main flap comprises perforations or a mesh section within the primary/main flap.

18. An end tube seal/end adapter gasket of an outlet gate/gate assembly for a hopper car and positioned between an end sheet of a trough section and an end adapter of the outlet gate/gate assembly, the end tube seal/end adapter gasket comprising:
a base plate and a primary/main flap, wherein the base plate defines a gasket discharge opening, and wherein the primary/main flap is connected to the base plate and configured such that, in a normal closed position, the primary/main flap completely covers the gasket discharge opening.

19. The end tube seal/end adapter gasket of claim 18, wherein the primary/main flap comprises perforations or a mesh section within the primary/main flap.

20. The end tube seal/end adapter gasket of claim 18, wherein the base plate and the primary/main flap are integrated.

21. The end tube seal/end adapter gasket of claim 18, wherein the primary/main flap is connected to the base plate by a material hinge.

22. The end tube seal/end adapter gasket of claim 18, wherein the gasket discharge opening is defined by a lower cutout and an upper cutout in the base plate and a plurality of material hinge sections along an upper portion of the primary/main flap.

23. The end tube seal/end adapter gasket of claim 18, wherein the end tube seal/end adapter gasket is stamped, cut, or otherwise formed from a gasket material.

24. The end tube seal/end adapter gasket of claim 23, wherein the gasket material is elastomeric.

25. The end tube seal/end adapter gasket of claim 24, wherein the gasket material is food grade or comprises a coating of the food grade material.

26. The end tube seal/end adapter gasket of claim 24, wherein the gasket material has a temperature rating in a range of from about −20° C. to 130° C.

\* \* \* \* \*